(12) United States Patent
Kutsumi et al.

(10) Patent No.: US 7,373,318 B2
(45) Date of Patent: May 13, 2008

(54) INFORMATION RECOMMENDATION APPARATUS AND INFORMATION RECOMMENDATION SYSTEM

(75) Inventors: Hiroshi Kutsumi, Moriguchi (JP); Shouichi Araki, Osaka (JP); Eiichi Naito, Kyotanabe (JP); Tomoyasu Hiratsuka, Ichihara (JP); Yuumi Jitousho, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 574 days.

(21) Appl. No.: 09/851,791

(22) Filed: May 9, 2001

(65) Prior Publication Data

US 2001/0044759 A1 Nov. 22, 2001

(30) Foreign Application Priority Data

May 17, 2000 (JP) .............................. 2000-145169

(51) Int. Cl.
*G06F 17/30* (2006.01)
(52) U.S. Cl. .......................................... 705/27; 705/26
(58) Field of Classification Search .................... 705/7, 705/10, 26, 27
See application file for complete search history.

(56) References Cited

U.S. PATENT DOCUMENTS

| | | | | |
|---|---|---|---|---|
| 5,749,081 A | * | 5/1998 | Whiteis | 707/102 |
| 5,872,850 A | * | 2/1999 | Klein et al. | 705/51 |
| 6,006,225 A | * | 12/1999 | Bowman et al. | 707/5 |
| 6,012,053 A | | 1/2000 | Pant et al. | |
| 6,212,545 B1 | * | 4/2001 | Ohtani et al. | 709/202 |
| 6,339,774 B1 | * | 1/2002 | Nakayama et al. | 707/10 |
| 7,143,089 B2 | * | 11/2006 | Petras et al. | 707/5 |
| 2001/0027416 A1 | * | 10/2001 | Nakamura | 705/14 |
| 2001/0047290 A1 | * | 11/2001 | Petras et al. | 705/10 |

FOREIGN PATENT DOCUMENTS

EP 1 050 830 A2 11/2000

OTHER PUBLICATIONS

Sloane; "Frequent Flier Perk First-Class Upgrade Most Sought After" Chicago Tribune, Mar. 4, 1990, Proquest #28817277, 3pgs.*
European Search Report corresponding to application No. EP 01-11-1063 dated Jul. 25, 2005.
Claypool, Mark, et al., "Combining Content-Based and Collaborative Filters in an Online Newspaper," ACM SIGIR Workshop on Recommender Systems -Implementation and Evaluation, Aug. 19, 1999, pp. 1-8, XP002331499, Berkeley, CA, USA.
Shafer, J.B., et al., "Recommender Systems in E-Commerce," Proceedings ACM Conference On Electronic Commerce, 1999, pp. 158-166, XP002199598.

* cited by examiner

Primary Examiner—Robert M. Pond
(74) Attorney, Agent, or Firm—RatnerPrestia

(57) ABSTRACT

An information recommendation apparatus selects and recommends contents coincident with or similar to conditions input. The conditions are represented by predetermined items and attribute values corresponding thereto, from among contents formed of plural pieces of data having plural items and attribute values corresponding thereto and stored in a content database in which the contents are registered, wherein the recommended contents are output to the terminal.

25 Claims, 28 Drawing Sheets

Fig. 3

| Data ID | 03421 | |
|---|---|---|
| Recipe name | Hamburger | |
| Cooking method | Sprinkle salt and pepper on minced meat, break an egg onto the meat, and mix them well ··· | |
| Ingredients | Minced meat | 300g |
| | Onion | 1 piece |
| | ⋮ | ⋮ |
| Cooking time | 30 minutes | |
| Calories | 630kcal | |
| Impression | Grade of easiness | 4 |
| | Grade of lightness | 2 |
| | ⋮ | |

Fig. 10
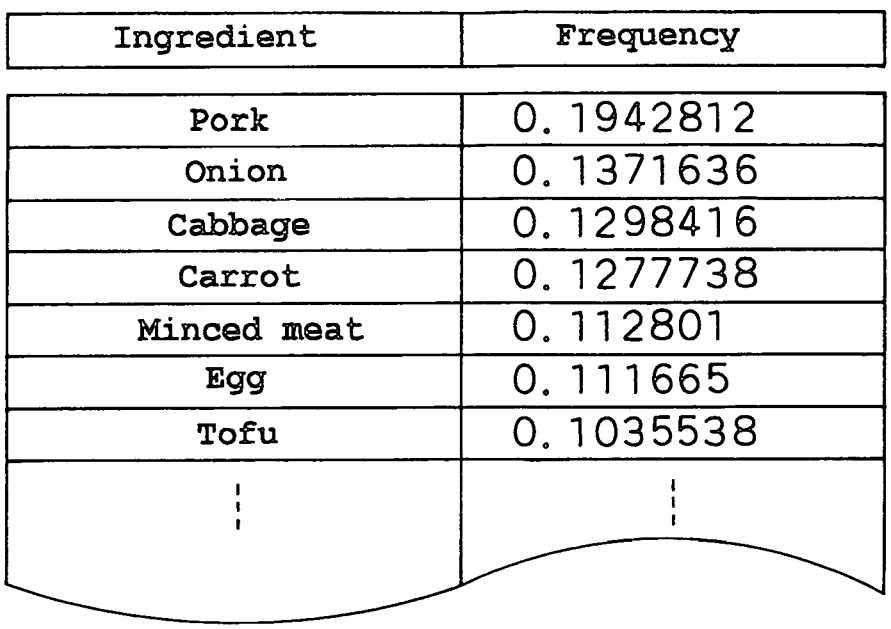
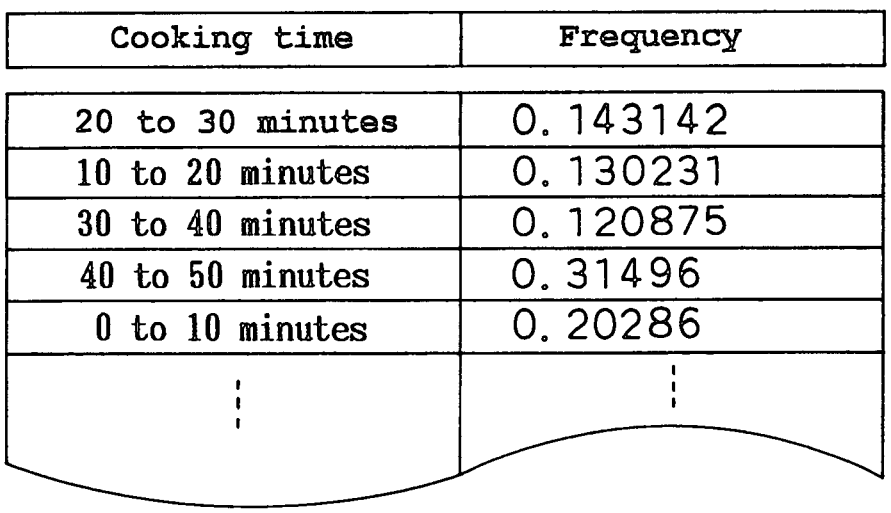
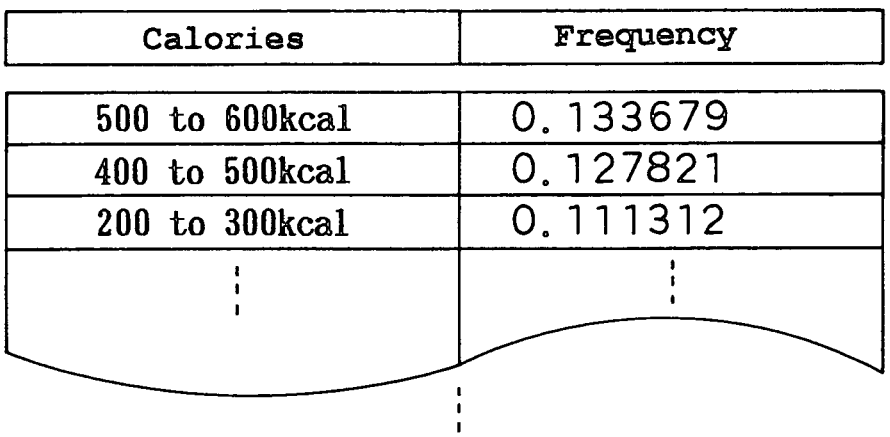

Fig. 11

| Data ID | 03421 | |
|---|---|---|
| Registrant ID | PAW24531 | |
| Recipe name | Hamburger | |
| Cooking method | Sprinkle salt and pepper on minced meat, break an egg onto the meat, and mix them well ··· | |
| Ingredients | Minced meat | 300g |
| | Onion | 1 piece |
| | ⋮ | ⋮ |
| Cooking time | 30 minutes | |
| Calories | 630kcal | |
| Impression | Grade of easiness | 4 |
| | Grade of lightness | 2 |
| | ⋮ | |

Fig. 14

| Data ID | AD3041 | |
|---|---|---|
| Counter | 00453 | |
| Advertisement | ☆☆ When it comes to meat, come and see "Matsusakaya." ！！☆☆<br>Bargain sale on all days. Matsusakaya is definitely on the side of homemakers!<br>In front of the fountain at Manrin shopping center, closed every Thursday | |
| Related information | Ingredient | Beef |
| | Price | Low |
| | ⋮ | ⋮ |

Fig. 15 http://www.osusume-recipe.com

These are recipes recommended to you!

1. Minced meat rolled in cabbage leaves

Cooking time: 60 minutes, 430 kcal
   Ingredients: cabbage, carrot, ...
   Cooking method:
      1. Chop cabbage coarsely ...
      ... ... ... ... ... ... ... ...
      ... ... ... ... ... ... ... ...

Photo

2. Stir-fried cabbage

Cooking time: 10 minutes, 640 kcal
   Ingredients: cabbage, pork, ...
   Cooking method:
      1. Chop cabbage finely ...
      ... ... ... ... ... ... ... ...
      ... ... ... ... ... ... ... ...

Photo

Fig. 16

```
┌─────────────────────────────────────────────────────┐
│              http://www.osusume-recipe.com          │
│  ┌───────────────────────────────────────────────┐  │
│  │                                               │  │
│  │  These are recipes recommended to you!        │  │
│  │                                               │  │
│  │  1. Minced meat rolled in cabbage leaves      │  │
│  │                                               │  │
│  │     Cooking time: 60 minutes, 430 kcal        │  │
│  │     Ingredients: cabbage, carrot, ...   Photo │  │
│  │     Cooking method:                           │  │
│  │       1. Chop cabbage coarsely ···            │  │
│  │       ··· ··· ··· ··· ··· ··· ··· ···         │  │
│  │       ··· ··· ··· ··· ··· ··· ··· ···         │  │
│  │                                               │  │
│  │                                               │  │
│  │  2. Stir-fried cabbage                        │  │
│  │                                               │  │
│  │     Cooking time: 10 minutes, 640 kcal        │  │
│  │     Ingredients: cabbage, pork, ...     Photo │  │
│  │     Cooking method:                           │  │
│  │       1. Chop cabbage finely ···              │  │
│  │       ··· ··· ··· ··· ··· ··· ··· ···         │  │
│  │       ··· ··· ··· ··· ··· ··· ··· ···         │  │
│  │                                               │  │
│  │  ┌─────────────────────────────────────────┐  │  │
│  │  │ ☆☆ When it comes to vegetables, come and see │  │
│  │  │                         "Yaosuke." !! ☆☆│  │  │
│  │  │ Bargain sale on all days. Yaosuke is definitely on the │
│  │  │ side of homemakers!                     │  │  │
│  │  │ At front entrance to Manrin shopping center, closed │
│  │  │ every Wednesday                         │  │  │
│  │  └─────────────────────────────────────────┘  │  │
│  └───────────────────────────────────────────────┘  │
└─────────────────────────────────────────────────────┘
                                                  200
```

Fig. 24

| Data ID | 03421 | |
|---|---|---|
| Recipe name | Hamburger | |
| Cooking method | Sprinkle salt and pepper on minced meat, break an egg onto the meat, and mix them well ··· | |
| Ingredients | Minced meat | 300g |
| | Onion | 1 piece |
| | ⋮ | ⋮ |
| Recipe name | Potato salad | |
| Cooking method | Boil potato, ... | |
| Ingredients | Potato | 2 pieces (middle size) |
| | Carrot | 1 piece |
| | ⋮ | ⋮ |

Fig. 29 http://www.osusume-recipe.com

These are recipes recommended to you,
"company employee living in the Kansai area."

1. Minced meat rolled in cabbage leaves

Cooking time: 60 minutes, 430 kcal
   Ingredients: cabbage, carrot, ...
   Cooking method:
      1. Chop cabbage coarsely ...
      ... ... ... ... ... ... ... ...
      ... ... ... ... ... ... ... ...

Photo

2. Stir-fried cabbage

Cooking time: 10 minutes, 640 kcal
   Ingredients: cabbage, pork, ...
   Cooking method:
      1. Chop cabbage finely ...
      ... ... ... ... ... ... ... ...
      ... ... ... ... ... ... ... ...

Photo

INFORMATION RECOMMENDATION APPARATUS AND INFORMATION RECOMMENDATION SYSTEM

BACKGROUND OF THE INVENTION

1. Field of the Invention

The present invention relates to an information recommendation apparatus, an information recommendation system and a program for providing information requested by a user from among abundant information through the Internet or the like.

2. Related Art of the Invention

Recently, information communication apparatuses, such as personal computers and portable information terminals, became widespread rapidly. Hence, when it is desired to obtain some new information, an action of gaining access to an information server and extracting desired information by using a WWW browser installed in such an information communication apparatus has been carried out daily. For example, when it is difficult to plan a dinner meal, a person gains access to a home page carrying abundant recipes for dishes and inputs desired conditions, such as ingredients, cooking time and calories, whereby he or she can obtain recipes conforming to the conditions.

On home pages carrying such recipes for dishes, recipes for very presentable dishes, recipes for nutritionally balanced dishes, etc. have been registered beforehand by cooking specialists, dieticians, etc. and these are searched for by users.

However, to realize information service using such an information server, abundant contents (recipes for dishes in this example), and the quality of the service greatly depends on the completeness of the contents. Hence, how to prepare abundant contents is a big problem.

In other words, in order to accomplish information service using an information server, how to prepare abundant contents is a problem.

In addition, since maintenance cost for constructing and maintaining such a large database is considerably high, it is necessary to have an arrangement for recovering the maintenance cost.

In other words, preparing an arrangement for recovering the maintenance cost for constructing and maintaining such a large database is a problem.

Furthermore, in a conventional information recommendation method, a user himself or herself is required to input desired information conditions. In this case, the user himself or herself is required to clarify information he or she desires. Hence, it is difficult to find out information that is exactly suited for the user but unnoticed.

In other words, the difficulty in finding out information that is exactly suited for the user but unnoticed is a problem in the conventional information recommendation method.

Furthermore, the recipes provided by the conventional method are ideal recipes prepared beforehand by cooking specialists, and the recipes are for gorgeous menus for guests rather than daily menus for family. Hence, the recipes are not suited for actual daily menus for family.

In other words, the recipes provided by the conventional method are not suited for actual daily menus for family, resulting in a problem.

Furthermore, the recipes prepared by the cooking specialists describe dishes that are excellent in nutritional balance and ideal in theory. However, the recipes are void of viewpoints obtained by the result of actually using the recipes, such as at what time a person wishes to eat a dish cooked according to one of the recipes and how the person felt after eating the dish. Hence, there is a danger that the recipes may become data not suited for actual situations.

In other words, the recipes provided by the conventional method are void of viewpoints obtained by the result of actually using the recipes, and there is a danger that the recipes may become data not suited for actual situations, resulting in a problem.

SUMMARY OF THE INVENTION

In consideration of the above-mentioned problems and in order to accomplish information service using an information server, the present invention is intended to provide an information recommendation apparatus, an information recommendation system and a program capable of preparing abundant contents.

Furthermore, in consideration of the above-mentioned problems, the present invention is intended to provide an information recommendation apparatus, an information recommendation system and a program capable of recovering maintenance cost for constructing and maintaining a large database.

Furthermore, in consideration of the above-mentioned problems, the present invention is intended to provide an information recommendation apparatus, an information recommendation system and a program capable of easily finding out information that is exactly suited for a user but unnoticed.

Furthermore, in consideration of the above-mentioned problems, the present invention is intended to provide an information recommendation apparatus, an information recommendation system and a program capable of providing recipes suited for actual daily menus for family.

Furthermore, in consideration of the above-mentioned problems, the present invention is intended to provide an information recommendation apparatus, an information recommendation system and a program capable of providing recipes not void of viewpoints obtained by the result of actually using the recipes and suited for actual situations.

A first exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto designated through the terminal of a user via the Internet, from among contents formed of plural pieces of data having plural items and attribute values corresponding thereto and stored in a content database in which said contents are registered by registration means, wherein said recommended contents are output to said terminal by output means via said Internet.

A second exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, and said items are subjective items resulting from human decisions and impressions, and/or objective items free from human decisions and impressions.

A third exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, and a scoring method for scoring points to each of said items depending on the degree of similarity is predetermined in order to judge the similarity between said conditions to be input and each of said contents.

A fourth exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, and a thesaurus is used to judge the similarity between said conditions to be input and each of said contents in the case when said attribute values are represented by words.

A fifth exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, and the number of times a user attempting to receive recommendation receives recommendation or the content of the recommendation is determined depending on the number of times said user carried out registration by using said content registration means.

A sixth exemplary embodiment of the present invention relates to an information recommendation apparatus according to the fifth exemplary embodiment, wherein the number of registration times of said user is determined (a) by checking the access history of said user with respect to registration or (b) by assigning the user ID of the registrant to said content and by using said user ID.

A seventh exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, and said conditions input to said condition input means are conditions extracted by condition extraction means of automatically extracting said conditions.

An eighth exemplary embodiment of the present invention relates to an information recommendation apparatus according to the seventh exemplary embodiment, wherein the conditions to be input to said condition input means are those extracted on the basis of contents registered in the past by a user who will receive recommendation.

A ninth exemplary embodiment of the present invention relates to an information recommendation apparatus according to the seventh exemplary embodiment, wherein the characteristic of each item of said user is obtained by calculation each time said user registers said data.

A tenth exemplary embodiment of the present invention relates to an information recommendation apparatus according to the seventh exemplary embodiment, wherein the conditions to be input to said condition input means are extracted on the basis of contents recommended in the past to a user who is attempting to receive recommendation or on the basis of contents recommended to and specified by said user.

An eleventh exemplary embodiment of the present invention relates to an information recommendation apparatus according to the tenth exemplary embodiment, wherein the characteristic of each item of said user is obtained by calculation by characteristic calculation means each time said user receives recommendation or each time said user receives recommendation and specifies the contents.

A twelfth exemplary embodiment of the present invention relates to an information recommendation apparatus according to the eighth or tenth exemplary embodiments, wherein, when said conditions are extracted from said contents, said conditions having tendencies opposite to those of said contents are extracted.

A thirteenth exemplary embodiment of the present invention relates to an information recommendation apparatus according to the seventh exemplary embodiment, wherein said condition input means inputs said externally input conditions and said automatically extracted conditions, and said recommendation means selects contents coincident with or similar to said automatically extracted conditions from only said contents conforming to said externally input conditions and recommend said selected contents.

A fourteenth exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, on the basis of contents registered in the past by a user attempting to receive recommendation, contents recommended to said user or contents recommended to and specified by said user, characteristic information calculation means of obtaining characteristic information by calculation for each of said items and storing said characteristic information obtains said characteristic information by calculation and stores said characteristic information, and in the case of recommendation to a specific user, said recommendation means specifies other users whose characteristic information is coincident or similar to said characteristic information of said specific user by using said stored characteristic information, and selects and recommends contents registered in the past by said other users, contents recommended to said other users or contents recommended to and specified by said other users.

A fifteenth exemplary embodiment of the present invention relates to an information recommendation apparatus comprising:

recommendation means of selecting and recommending recipes coincident with or similar to conditions input by condition input means of inputting said conditions represented by predetermined items and attribute values corresponding thereto from a content database, that is, from among said recipes formed of plural pieces of data having plural items and attribute values corresponding thereto and stored in said content database in which said recipes are registered by registration means, wherein said recommended contents are output by output means, said content database is classified into recipe groups for dishes taken for a meal, and when said conditions are input, said recommendation means determines a recipe coincident with or most similar to said conditions, and selects and determines all or part of recipes other than said determined recipe.

A sixteenth exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, on the basis of contents registered in the past by a user attempting to receive recommendation, contents recommended to said user or contents recommended to and specified by said user, characteristic information calculation means of obtaining characteristic information by calculation for each of said items and storing said characteristic information obtains said characteristic information by calculation and stores said characteristic information, while various characteristics regarding said user have been input, type information calculation means of using said characteristic information obtained for each of said items by calculation for each characteristic as said type information, and type judgment means judges the type of said user attempting to receive recommendation by comparing said characteristic information of said user attempting to receive recommendation with said type information.

A seventeenth exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, and among advertisements stored in an advertisement database for storing plural advertisements having related information having the same configuration as those of said items and said attribute values in said contents, advertisements coincident with or similar to said input conditions are specified by advertisement specifying means.

An eighteenth exemplary embodiment of the present invention relates to an information recommendation apparatus comprising:

recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means, wherein said recommended contents are output by output means, and among advertisements stored in an advertisement database for storing plural advertisements having related information having the same configuration as those of said item and said attribute value in said contents, on the basis of contents registered in the past by a user attempting to receive recommendation, contents recommended to said user or contents recommended to and specified by said user, said advertisement, which is similar to the characteristic information of each item for said user and is obtained by calculation and stored, is specified by advertisement specifying means.

A nineteenth exemplary embodiment of the present invention relates to an information recommendation apparatus according to the seventeenth or eighteenth exemplary embodiments, wherein the number of times said advertisement is specified is counted by an advertisement counter, and an advertisement rate is charged depending on the count value of said advertisement counter.

A twentieth exemplary embodiment of the present invention relates to an information recommendation apparatus according to one of the first to sixth and thirteenth to nineteenth exemplary embodiments, wherein said condition input means inputs said conditions by using a one-dimensional or two-dimensional interface.

A twenty-first exemplary embodiment of the present invention relates to an information recommendation apparatus according to one of the first to nineteenth exemplary embodiments, wherein said recommendation means does not recommend said contents recommended to a user in a predetermined period in the past to said user again.

A twenty-second exemplary embodiment of the present invention relates to an information recommendation apparatus according to one of the first, second, and fifth to nineteenth exemplary embodiments, wherein said recommendation means selects and recommends contents including a character string coincident with the character string included in said input conditions from said content database.

A twenty-third exemplary embodiment of the present invention relates to an information recommendation apparatus comprising:

from among contents formed of plural pieces of data having plural items and attribute values corresponding thereto and stored in a content database in which said contents are registered by registration means, recommendation means, in the case when recommendation is performed to said user having an input user ID, of specifying other users whose characteristic information is coincident or similar to said characteristic information of said user having said user ID by using said characteristic information, and of selecting and recommending only the contents not recommended to said user having said user ID or only the contents recommended to but not specified by said user from among contents registered in the past by said specified user, contents recommended to said user or contents recommended to and specified by said user, wherein said recommended contents are output by output means, and said characteristic information is obtained by calculation for each item and stored by characteristic information calculation means on the basis of contents registered in the past by each user attempting to receive recommendation, contents recommended to said user or contents recommended to and specified by said user.

A twenty-fourth exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values via the Internet when said conditions are designated through the terminal of a user;

recommendation means of selecting and recommending contents coincident with or similar to said input conditions from said content database; and output means of outputting said recommended contents to said terminal via said Internet.

A twenty-fifth exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database; and output means of outputting said selected contents, wherein said items are subjective items resulting from human decisions and impressions, and/or objective items free from human decisions and impressions.

A twenty-sixth exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database; and output means of outputting said recommended contents, wherein a scoring method for scoring points to each of said items depending on the degree of similarity is predetermined in order to judge the similarity between said conditions to be input and each of said contents.

A twenty-seventh exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database; and output means of outputting said recommended contents, wherein a thesaurus is used to judge the similarity between said conditions to be input and each of said contents in the case when said attribute values are represented by words.

A twenty-eighth exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database; and output means of outputting said recommended contents, wherein the number of times a user attempting to receive recommendation receives recommendation or the content of the recommendation is determined depending on the number of times said user carried out registration by using said content registration means.

A twenty-ninth exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database;

output means of outputting said recommended contents, and condition extraction means of automatically extracting said conditions, wherein said conditions input to said condition input means are conditions extracted by condition extraction means.

A thirtieth exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database;

output means of outputting said recommended contents; and characteristic information calculation means of obtaining characteristic information by calculation for each of said items and storing said characteristic information on the basis of contents registered in the past by a user attempting to receive recommendation, contents recommended to said user or contents recommended to and specified by said user, wherein, in the case of recommendation to a specific user, said recommendation means specifies other users whose characteristic information is coincident or similar to said characteristic information of said specific user by using said stored characteristic information, and selects and recommends contents registered in the past by said other users, contents recommended to said other users or contents recommended to and specified by said other users.

A thirty-first exemplary embodiment of the present invention relates to an information recommendation system comprising:

a content database for storing recipes formed of plural pieces of data having plural items and attribute values corresponding thereto;

content registration means of registering said recipes in said content database;

condition input means of inputting conditions represented by predetermined items and attribute values;

recommendation means of selecting and recommending recipes coincident with or similar to said input conditions from said content database; and output means of outputting said recommended contents, wherein said content database is classified into recipe groups for dishes taken for a meal, and when said conditions are input, said recommendation means determines a recipe coincident with or most similar to said conditions, and selects and determines all or part of recipes other than said determined recipe.

A thirty-second exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined item and attribute values;

recommendation means of selecting and recommending contents coincident with or similar to said input conditions from said content database;

output means of outputting said recommended contents;

characteristic information calculation means of obtaining characteristic information by calculation for each of said items and storing said characteristic information on the basis of contents registered in the past by a user attempting to receive recommendation, contents recommended to said user or contents recommended to and specified by said user;

type information calculation means of using said characteristic information obtained by calculation for each characteristic as type information, while various characteristics regarding said user have been input; and type judgment means of judging the type of said user attempting to receive recommendation by comparing said characteristic information of said user with said type information.

A thirty-third exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database;

output means of outputting said recommended contents;

advertisement database for storing plural advertisements having related information having the same configuration as those of said items and said attribute values in said contents; and advertisement specifying means of specifying advertisements coincident with or similar to said input conditions among advertisements stored in said advertisement database.

A thirty-fourth exemplary embodiment of the present invention relates to an information recommendation system comprising:

a content database for storing contents formed of plural pieces of data having plural items and attribute values corresponding thereto;

content registration means of registering said contents in said content database;

condition input means of inputting conditions represented by predetermined items and attribute values;

recommendation means of selecting and recommending contents coincident with or similar to said input conditions from said content database;

output means of outputting said recommended contents;

advertisement database for storing plural advertisements having related information having the same configuration as those of said items and said attribute values in said contents; and advertisement specifying means of specifying an advertisement, which is similar to the characteristic information of each item for a user and obtained by calculation and stored on the basis of contents registered in the past by said user attempting to receive recommendation, contents recommended to said user or contents recommended to and specified by said user, among said advertisements stored in said advertisement database.

A thirty-fifth exemplary embodiment of the present invention an information recommendation system comprising:

a content database for storing contents formed of plural pieces of data having plural items and attribute values corresponding thereto;

content registration means of registering said contents in said content database;

characteristic information calculation means of obtaining characteristic information by calculation for each of said items and storing said characteristic information on the basis of contents registered in the past by a user attempting to receive recommendation, contents recommended to said user or contents recommended to and specified by said user;

recommendation means, in the case when recommendation is performed to said user having an input user ID, of specifying other users whose characteristic information is coincident with or similar to said characteristic information to said user having said user ID by using stored characteristic information, and of selecting and recommending only the contents not recommended to said user having said user ID or the contents recommended to but not specified by said user from among contents registered in the past by said specified user, contents recommended to said user or contents recommended to and specified by said user, in said content database; and output means of outputting said recommended contents.

A thirty-sixth exemplary embodiment of the present invention relates to a program, in an information recommendation apparatus according to the first exemplary embodiment, for making a computer function as all or part of recommendation means of selecting and recommending contents coincident with or similar to conditions input by condition input means of inputting said conditions represented by predetermined items and attribute values corresponding thereto designated through the terminal of a user via the Internet, from among contents formed of plural pieces of data having plural items and attribute values corresponding thereto and stored in a content database in which said contents are registered by registration means.

A thirty-seventh exemplary embodiment of the present invention relates to a program, in an information recommendation apparatus according to one of second to fourteenth and sixteenth to eighteenth exemplary embodiments, for making a computer function as all or part of recommendation means of selecting and recommending contents coincident with or similar to conditions input by condition input means of inputting said conditions represented by predetermined items and attribute values corresponding thereto, from among contents formed of plural pieces of data having plural items and attribute values corresponding thereto and stored in a content database in which said contents are registered by registration means.

A thirty-eighth exemplary embodiment of the present invention relates to a program, in an information recommendation apparatus according to the fifteenth exemplary embodiment, for making a computer function as all or part of recommendation means of selecting and recommending recipes coincident with or similar to conditions input by condition input means of inputting said conditions represented by predetermined items and attribute values corresponding thereto, from among said recipes formed of plural pieces of data having plural items and attribute values corresponding thereto and stored in a content database in which said recipes are registered by registration means.

The thirty-ninth exemplary embodiment of the present invention relates to a program, in an information recommendation apparatus according to the twenty-third exemplary embodiment, for making a computer function as all or part of recommendation means, in the case when recommendation is performed to said user having an input user ID, of specifying other users whose characteristic information coincident with or similar to said characteristic information to said user having said user ID by using characteristic information, and of selecting and recommending only the contents not recommended to said user having said user ID or the contents recommended to but not specified by said user from among contents registered in the past by said specified user, contents recommended to said user or contents recommended to and specified by said user, from among contents formed of plural pieces of data having plural items and attribute values corresponding thereto and stored in a content database in which said contents are registered by registration means.

In the twenty-eighth exemplary embodiment of the present invention, the number of registration times of the user may be determined (a) by checking the access history of the user with respect to registration or (b) by assigning the user ID of the registrant to the content and by using the user ID.

In the twenty-ninth exemplary embodiment of the present invention, the conditions to be input to the condition input means may be those extracted on the basis of contents registered in the past by a user who will receive recommendation.

In the twenty-ninth exemplary embodiment of the present invention, the system may be provided with a characteristic calculation means of obtaining the characteristic of each item of the user by calculation each time the user registers the data.

In the twenty-ninth exemplary embodiment of the present invention, the conditions to be input to the condition input means may be those extracted on the basis of contents recommended in the past to a user who is attempting to receive recommendation or on the basis of contents recommended to the user and specified by the user.

Furthermore, in the above descriptions, the system may be provided with characteristic calculation means of obtaining the characteristic of each item of the user by calculation each time the user receives recommendation or each time the user receives recommendation and specifies the recommendation.

Furthermore, in the above descriptions, when the conditions are extracted from the contents, the conditions having tendencies opposite to those of the contents may be extracted.

In the twenty-ninth exemplary embodiment of the present invention, the condition input means may input the externally input conditions and the automatically extracted conditions, and the recommendation means may select contents coincident with or similar to the automatically extracted conditions from only the contents conforming to the externally input conditions and may recommend the selected contents.

In the thirty-third and thirty-fourth exemplary embodiments of the present invention, the system may be provided with an advertisement counter for counting the number of times the advertisement is specified, wherein an advertisement rate may be charged depending on the count value of the advertisement counter.

In the twenty-fourth to twenty-eighth and thirtieth to thirty-fourth exemplary embodiments of the present invention, the condition input means may input the conditions by using a one-dimensional or two-dimensional interface.

In the twenty-fourth to thirty-fourth exemplary embodiments of the present invention, the contents recommended to the user in a predetermined period in the past may not be recommended again to the user by the recommendation means.

In the twenty-fourth, twenty-fifth, twenty-eighth and thirty-fourth exemplary embodiments of the present invention, contents including a character string coincident with the character string included in the input conditions may be selected from the content database and recommended.

As embodiment, the present invention comprises network interface means connected to a terminal via the Internet to perform data communication, a content database for storing information to be recommended, recommendation condition input means of accepting the conditions of information desired to be recommended, content recommendation means of selecting contents conforming to recommendation conditions input from the recommendation condition input means, and content output means of outputting contents selected by the content recommendation means, wherein groups of the titles of contents and their objective and subjective characteristic amounts are registered as content data, and appropriate contents are recommended depending on the objective or subjective recommendation conditions from a user.

Furthermore, as an embodiment, the present invention comprises network interface means connected to a terminal via the Internet to perform data communication, a content database for storing information to be recommended, user identification means of identifying a user who made access at the time of access from the terminal, access history control means of controlling the access history of the user, content registration means of accepting registration of new contents from the terminal, recommendation condition input means of accepting the conditions of information desired to be recommended, content recommendation means of selecting contents conforming to recommendation conditions input from the recommendation condition input means, and content output means of outputting contents selected by the content recommendation means, wherein information is recommended depending on the registration results of content data of the user, thereby to urge the user to register content data.

Furthermore, as an embodiment, the present invention has a configuration wherein, as content data, items regarding the cause-effect relations between the state before the content data is selected and the state after the content data is selected are registered in the content database, and the state before the content data is selected or a state desired to be obtained after the content data is selected is input, thereby to recommend content data depending on the state before the content data is selected or the state desired to be obtained after the content data is selected.

Furthermore, as an embodiment, the present invention has a configuration wherein, as content data, items in view of a person who generated the content data and items in view of a person who selects the content data are registered in the content database, and the viewpoint of the person who generates the content data or the viewpoint of the person who selects the content data is input, thereby to recommend content data depending on the viewpoint of the person who generates the content data and the viewpoint of the person who selects the content data.

Furthermore, as an embodiment, the present invention has a configuration wherein items capable of being represented quantitatively are used as the conditions of information desired to be recommended, and the recommendation conditions are input by using a pointer or a slider capable of being moved up-and-down or right-and-left, wherein the quantitative values of the recommendation conditions can be input visually.

Furthermore, as an embodiment, the present invention has a configuration wherein two kinds of items capable of being represented quantitatively are used as the conditions of information desired to be recommended, and the quantitative values of the two kinds of recommendation conditions can be input at a time by using a pointer capable of being movable up-and-down and right-and-left on a two-dimensional plane having the abscissa representing a first condition and the ordinate representing a second condition, whereby the two quantitative values in the recommendation conditions can be input visually at a time.

Furthermore, as an embodiment, the present invention comprises network interface means connected to a terminal via the Internet to perform data communication, a content database for storing information to be recommended, user identification means of identifying a user who made access at the time of access from the terminal, access history control means of controlling the access history of the user, content registration means of accepting registration of new contents from the terminal, recommendation condition extraction means of extracting recommendation conditions from the characteristic amounts of contents registered previously by the user, recommendation condition input means of accepting recommendation conditions extracted by the recommendation condition extraction means, content recommendation means of selecting contents conforming to recommendation conditions input from the recommendation condition input means, and content output means of outputting contents selected by the content recommendation means, wherein recommendation conditions are extracted automatically from the data registered by the user, whereby the recommendation conditions are not required to be input at the time of information recommendation.

Furthermore, as an embodiment, the present invention comprises network interface means connected to a terminal via the Internet to perform data communication, a content database for storing information to be recommended, recommendation condition input means of accepting the conditions of information desired to be recommended, content recommendation means of selecting contents conforming to recommendation conditions input from the recommendation condition input means, content output means of outputting contents selected by the content recommendation means, and an advertisement database for providing advertisement data, wherein, when recommended information is given to a user, an advertisement related thereto is displayed simultaneously, and the number of times the advertisement is displayed is counted, whereby an advertisement rate can be charged to the advertiser of the advertisement depending on the number of times the advertisement is displayed.

Furthermore, as an embodiment, the present invention has a configuration wherein information is transmitted and received by using a WWW browser or electronic mail to exchange data between an information recommendation apparatus and the terminals of users via the Internet used as a medium. Hence, the recommendation of information can be received by terminals, such as personal computers, portable information terminals and portable telephones.

Furthermore, as an embodiment, the present invention comprises network interface means connected to a terminal via the Internet to perform data communication, recommendation condition input means of accepting the conditions of information desired to be recommended, a content database for storing information to be recommended, user identification means of identifying a user who made access at the time of access from the terminal, access history control means of controlling the access history of the user, content registration means of accepting registration of new contents from the terminal, user characteristic information calculation means of extracting the tendencies of favorite contents of the user from the characteristic amounts of the contents registered previously by the user or from the characteristic amounts of the contents selected previously by the user, user characteristic information database in which user characteristic information extracted by the user characteristic information calculation means is registered, similar user selection means of selecting users having similar tendencies of favorite contents in comparison with user characteristic information, content recommendation means of selecting contents conforming to recommendation conditions input from the recommendation condition input means, and content output means of outputting contents selected by the content recommendation means, wherein, when the recommendation of content data is requested, the tendencies of favorite contents of the user are extracted from the characteristic amounts of content data registered or selected previously by the user, the tendencies are compared between users, users similar to the user are selected, and content data is recommended depending on recommendation conditions designated by the user from among content data registered previously by the selected similar users, whereby the favorite contents of users having similar preferences are recommended.

Furthermore, as an embodiment, the present invention has a configuration wherein, by inputting the title of content data registered in the content database or by inputting a part of a character string constituting a characteristic amount for characterizing the content data as a recommendation condition, content data, the title of which or a part of a character string constituting a characteristic amount of which is partially coincident with the recommendation condition, is recommended as content data to be recommended, whereby various contents related to or derived from a certain content are recommended.

Furthermore, as an embodiment, the present invention has a configuration wherein one set of content records is formed of at least two or more contents, many content records formed as described above are registered in a content database, a title is input as a recommendation condition, sets of content records including the content input as the recommendation condition are first selected as content data to be recommended, contents not conforming to the recommendation condition are output as contents to be recommended from among two or more contents constituting each of content records, whereby contents suited to be used as a set when combined with a certain content are recommended.

Furthermore, as an embodiment, the present invention comprises network interface means connected to a terminal via the Internet to perform data communication, recommendation condition input means of accepting the conditions of information desired to be recommended, a content database for storing information to be recommended, user identification means of identifying a user who made access at the time of access from the terminal, access history control means of controlling the access history of the user, content registration means of accepting registration of new contents from the terminal, type information characteristic information calculation means of extracting the tendencies of favorite contents of the user conforming to a certain condition from the characteristic amounts of the contents registered previously by the user or from the characteristic amounts of the contents selected previously by the user, type information database in which type information obtained by calculation by the type information calculation means is registered, type information selection means of selecting a type having similar tendencies of favorite contents of the user in comparison with type information, content recommendation means of selecting contents conforming to recommendation conditions input from the recommendation condition input means, and content output means of outputting contents and type information selected by the content recommendation means, wherein, when the recommendation of content data is requested, the tendencies of favorite contents of the user are extracted from the characteristic amounts of content data registered or selected previously by the user, the tendencies of favorite contents of the user conforming to a certain condition are obtained by calculation at the same time, the tendencies of contents of the user are compared with type information, type information similar to that of the user is selected, and content data depending on recommendation conditions designated by the user is recommended, and type information is displayed, whereby type information, which corresponds to the user and on which information recommendation is based, is displayed at the time of information recommendation.

BRIEF DESCRIPTION OF DRAWINGS

FIG. 3 is a view showing an example of content data in accordance with Embodiment 1 of the present invention;

FIG. 10 is a list indicating the tendencies of user's favorite ingredients in accordance with Embodiment 3 of the present invention;

FIG. 11 is a view showing an example of content data in accordance with Embodiment 3 of the present invention;

FIG. 14 is a view showing an example of advertisement data in accordance with Embodiment 4 of the present invention;

FIG. 15 is a view showing an example of a display in accordance with Embodiment 1 of the present invention;

FIG. 16 is a view showing an example of a display in accordance with Embodiment 4 of the present invention;

FIG. 24 is a view showing an example of content data in accordance with Embodiment 7 of the present invention;

FIG. 29 is a view showing an example of a display in accordance with Embodiment 8 of the present invention;

Figure 1:
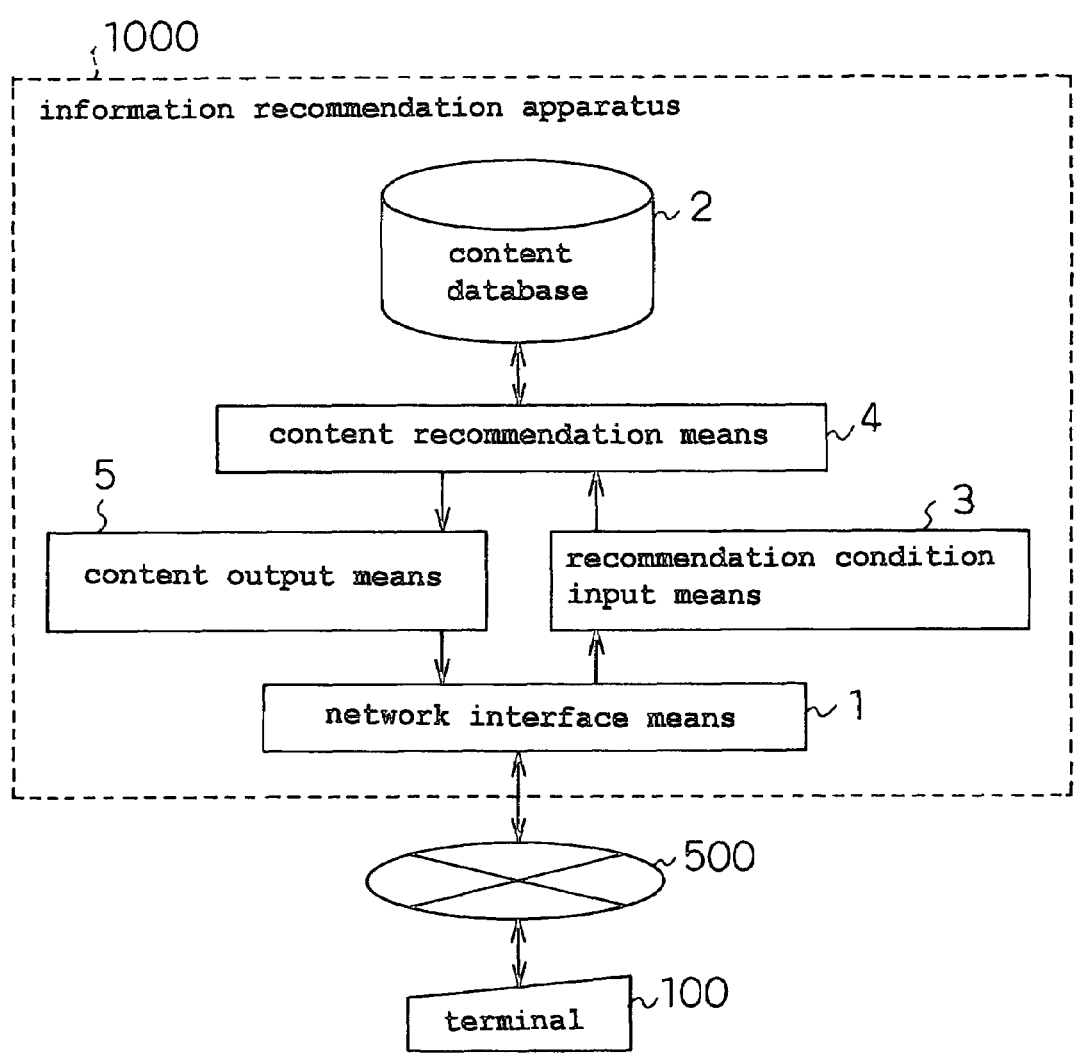
FIG. 1 is a view showing a system configuration in accordance with Embodiment 1 of the present invention.

REFERENCE NUMERALS 1 network interface means
2 content database
3 recommendation condition input means
4 content recommendation means
5 content output means
6 user identification means
7 access history control means
8 content registration means
9 recommendation condition extraction means
10 advertisement database
11 similar user selection means
12 user characteristic information database
13 user characteristic information calculation means
14 type information selection means
15 type information calculation means
16 type information database
100 terminal
200 advertisement
210 slider
220 pointer
500 Internet
1000 information recommendation apparatus

DETAILED DESCRIPTION OF THE INVENTION

Embodiments in accordance with the present invention will be described below referring to the accompanying drawings.

Embodiment 1

First, Embodiment 1 in accordance with the present invention will be described below.

FIG. 1 is a view showing the system configuration of an information recommendation apparatus 1000 in accordance with Embodiment 1 of the present invention. In FIG. 1, numeral 1 designates network interface means connected to a terminal 100 via the Internet 500 to perform data communication, numeral 2 designates a content database for storing recommended information, numeral 3 designates recommendation condition input means of accepting the conditions of information desired to be recommended, numeral 4 designates content recommendation means of selecting contents conforming to the recommendation conditions input from the recommendation condition input means 3, and numeral 5 designates content output means of outputting contents selected by the content recommendation means 4.

Furthermore, since a hardware configuration by which the system configured as described above is operated is basically identical to that of a general-purpose computer system, the explanation of the configuration is omitted.

Figure 2:
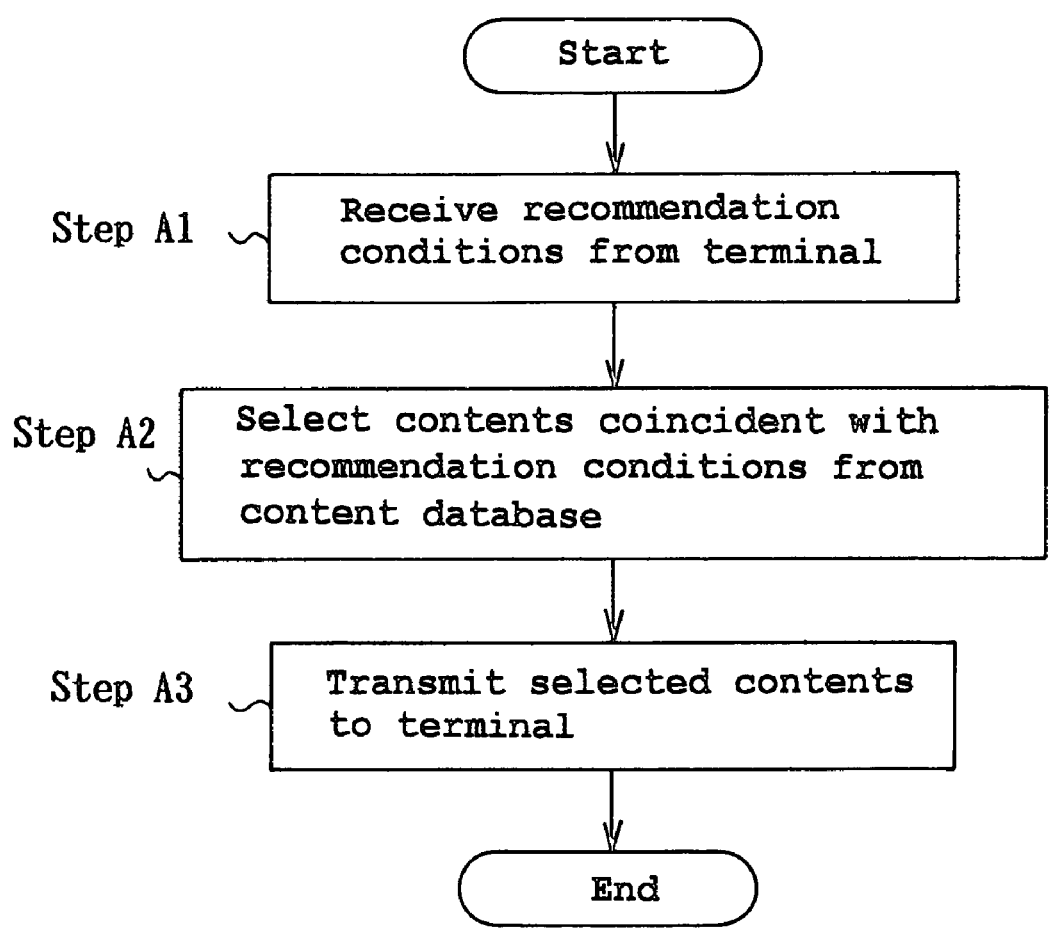
FIG. 2 is a flowchart showing information recommendation operation in accordance with Embodiment 1 of the present invention.

The operation of the information recommendation apparatus 1000 operating by using the system configured as described above will be explained below. The explanation will be given referring to a flowchart shown in FIG. 2 by using a dish recommendation system as an example.

(Step A1)

Recommendation conditions input by a user through the terminal 100 are transmitted via the Internet 500 and received by the network interface means 1 of the information recommendation apparatus 1000.

For example, when an item "ingredients" and its attribute values "beef, carrot and onion" are input as recommendation conditions by using the terminal 100, they are transmitted to the information recommendation apparatus 1000 and input to the recommendation condition input means 3. The item and the attribute values will be explained later.

(Step A2)

Contents conforming to the recommendation conditions received at step A1 are selected from the content database 2.

Data of recipes for dishes has been registered as content data in the content database 2. A specific example of recipe data is shown in FIG. 3.

In FIG. 3, each of the contents comprises plural pieces of data having a plurality of items and attribute values corresponding to the items. In other words, items, such as "data ID," "recipe name," "cooking method," "ingredients," "cooking time," "calories" and "impression," are available as items designating the attributes of the data. Hamburger is written as an attribute value corresponding to the item "recipe name," and a hamburger cooking method is written as an attribute value corresponding to the item "cooking method." Furthermore, the attribute values corresponding to the items "ingredients," "cooking time" and "calories" are also written specifically. These items "ingredients," "cooking time" and "calories" are used to characterize the recipe for the hamburger and are designated by the names of specific ingredients and physical amounts. These are referred to as objective characteristic amounts.

In addition, the attribute values corresponding to the item "impression" are characteristic amounts from subjective viewpoints of the author or the registrant of the content of this recipe. As examples of such characteristic amounts, "the grade of easiness" is 4 and "the grade of lightness" is 2 in accordance with a five-grade evaluation method. These are referred to as subjective characteristic amounts.

Furthermore, the items and attribute values input as recommendation conditions at step A1 are configured so as to be similar to the items and attribute values of the content shown in FIG. 3.

These subjective characteristic amounts may be described quantitatively, such as an attribute value "the grade of easiness=4." Alternatively, the subjective characteristics may be simply described qualitatively, such as attribute values "easy" and "light."

In this Embodiment, "impression" is provided as an item representing a subjective characteristic, and the attribute values corresponding to this item are given by "the grade of easiness=4" and "the grade of lightness=2" in the above-mentioned descriptions. However, instead of this, "the grade of easiness" may be provided as an item, and the attribute value corresponding thereto may be represented by 4. In addition, "the grade of lightness" may be provided as an item, and the attribute value corresponding thereto may be represented by 2. In other words, a plurality of items representing subjective characteristics may be provided, and the attribute values corresponding to the items respectively may be represented by numeral values.

Abundant pieces of recipe data are registered in the content database 2 in the above-mentioned format. The content recommendation means 4 compares the recommendation conditions input at step A1 with the attribute values of the recipe data, and selects content data having high degrees of coincidence.

(Step A3)

The contents (recipe data) selected at step A2 are transmitted from the content output means 5 to the terminal 100 via the network interface means 1. The contents and lists are displayed on the display screen of the terminal 100.

The displaying method of the terminal 100 is not required to have particular characteristics. However, for example, recipes are displayed on a WWW browser as shown in FIG. 15. When all pieces of recommended content data cannot be displayed once, they can be seen by scrolling the display of the WWW browser or by turning its pages.

Figure 4:
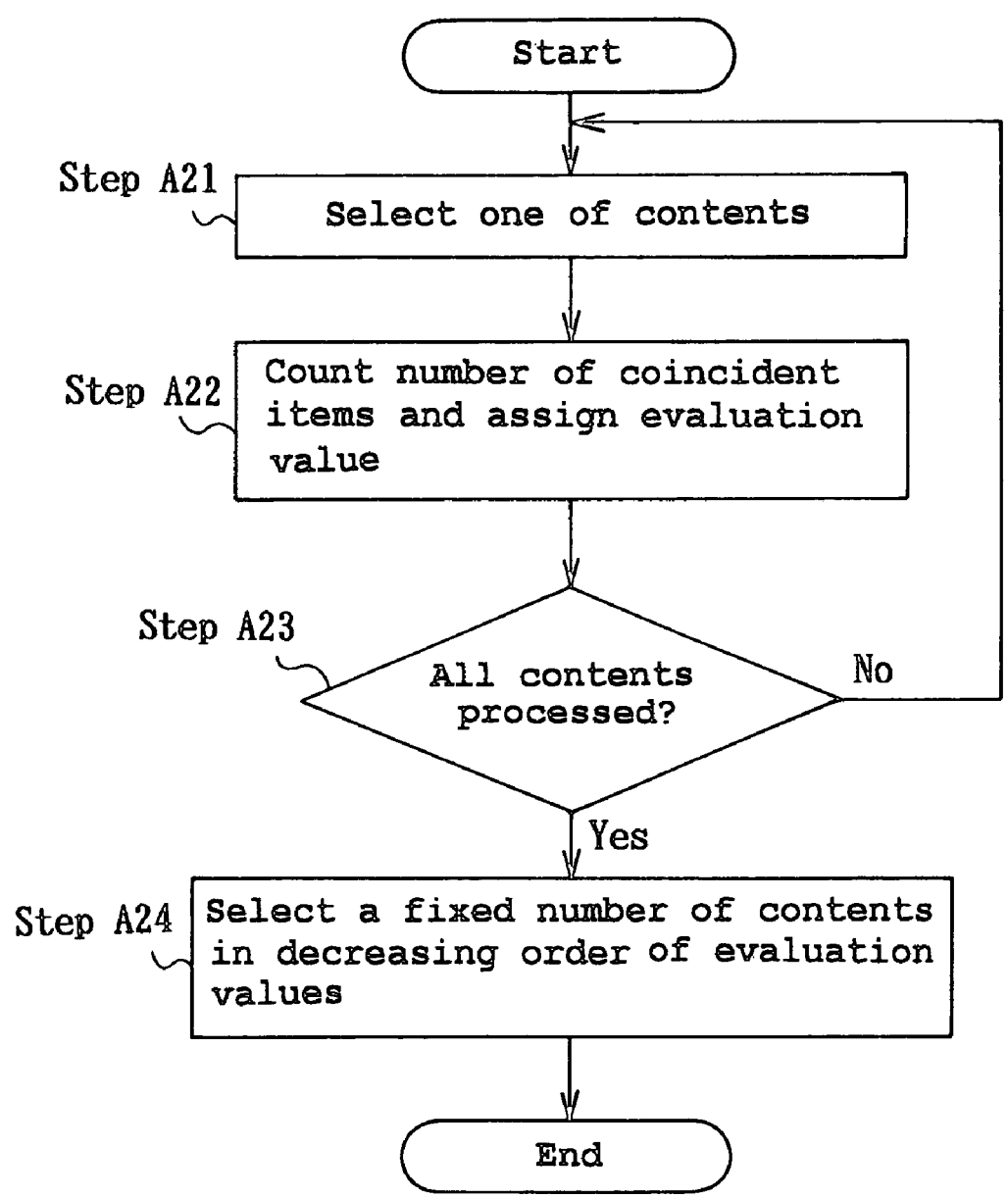
FIG. 4 is a flowchart showing specific information recommendation operation in accordance with Embodiment 1 of the present invention.

The contents are recommended by the above-mentioned procedure. As a specific method of selecting the recommended contents at step A2, the method shown in FIG. 4 is used.

(Step A21)

From the content database 2, one of the contents is selected.

(Step A22)

The selected content data has been registered in a format indicated in FIG. 3.

The attribute values "beef, carrot and onion" corresponding to the item "ingredients" used as recommendation conditions are compared with the attribute values corresponding to the item "ingredients" of the content data. The number of coincident attribute values is then counted. For example, when the currently selected content is the hamburger shown in FIG. 3, "onion" in the attribute values of the item "ingredients" coincides with the attribute value corresponding to the item "ingredients" of the recommendation conditions. Hence, the number of the coincident attribute values is one. This count value multiplied by three is set as an evaluation value for the item "ingredients" of the hamburger.

In other words, in order to judge the similarity between input recommendation conditions and the contents, a scoring method by which each item is scored depending on the degree of similarity has been determined beforehand. The evaluation value for the item "ingredients" of the above-mentioned hamburger is calculated by this scoring method. That is to say, in the above-mentioned example, by the scoring method for the item "ingredients", the number of the coincident attribute values corresponding to the item "ingredients" is multiplied by three, and the result is used as the score of the item "ingredients". By carrying out scoring by using this scoring method, the evaluation value of the item "ingredients" for the hamburger becomes three as described above.

(Step A23)

Next, a confirmation is made as to whether contents not yet provided with evaluation values for the recommendation conditions are present in the content database 2 or not. If such data is present, the processing sequence returns to step A21, and the processing for the next content data continues.

If the processing is completed concerning all of content data, the processing sequence advances to step A24.

(Step A24)

In the end, a fixed number of contents in decreasing order of the evaluation values assigned at step A22 are selected. This fixed number may have been determined beforehand by the system. The fixed number may be input as the maximum recommendation number by the user at the time when the recommendation conditions are input.

By taking the above-mentioned procedure, it is possible to select data conforming to the recommendation conditions from among all of content data in the content database 2 and to display the data.

A scoring method has also been predetermined for each of other items. It is possible to calculate the evaluation value of the item depending on a score. Since the evaluation value of each item is given by a score, even if a recommendation condition includes a plural kinds of items and attribute values corresponding to the items, contents comprehensively conforming to the recommendation condition can be recommended by compiling the evaluation values of the items and by selecting the fixed number of contents in decreasing order of the evaluation values.

In this embodiment, the objective and qualitative condition meaning that the attribute values of the item "ingredients" are "beef, carrot and onion" is used as a recommendation condition as described above. However, the present invention is not limited to this embodiment. For example, objective and quantitative conditions may also be used.

More specifically, a condition "cooking time 30 minutes" may be used as a recommendation condition. The condition "cooking time 30 minutes" is assumed to mean that the item of the recommendation condition is "cooking time," and that the attribute corresponding to the item is 30 minutes.

In this case, as a recommended content selection method, without counting the number of coincident attribute values in the content data at step A22 of FIG. 4, it may be possible to use a method of evaluating the absolute value of the difference between the attribute value of the recommendation condition and the attribute value of each of contents. For example, when the absolute value of the difference between the attribute values is 5 or less, a score of 2 is given, when the absolute value is 6 or more and 10 or less, a score of 1 is given, and when the absolute value is 11 or more, a score of 0 is given. In this case, if the attribute value of the recommendation condition is 30 minutes and if the cooking time for a recipe is 20 minutes, the absolute value of the difference between the attribute values is 10. Hence, a score of 1 is given as the evaluation value. As described above, the scoring method for the item "cooking time" is different from the scoring method for the above-mentioned item "ingredients."

Furthermore, in the above example, information recommendation is performed on the basis of objective characteristic amounts. However, information recommendation may be performed on the basis of subjective characteristic amounts. For example, "the grade of easiness 3, the grade of lightness 4" may be input as a subjective and quantitative condition used as a recommendation condition.

The expression "the grade of easiness 3, the grade of lightness 4" is assumed to mean that the item of the recommendation condition is "impression" and that the attribute values corresponding to the item are the grade of easiness 3 and the grade of lightness 4.

In the case when a plurality of items representing subjective characteristics, such as "the grade of easiness" and "the grade of lightness," are provided, and when an attribute value corresponding to each item is represented by a numeral value, "the grade of easiness 3, the grade of lightness 4" means that the recommendation condition has two items "the grade of easiness" and "the grade of lightness," and that the attribute value corresponding to "the grade of easiness" is 3 and the attribute value corresponding to "the grade of lightness" is 4.

In addition, recommendation conditions can be represented by either of these methods. However, the recommendation conditions are assumed to represent subjective characteristics in accordance with the same method wherein contents represent subjective characteristics.

In this case, as a recommended content selection method, without counting the number of coincident attribute values at step A22 of FIG. 4, it may be possible to use a method of evaluating the absolute value of the difference between the attribute value corresponding to the item representing the subjective item of the recommendation condition and the attribute value corresponding to the item identical to the item in each of contents represented in the recommendation condition. For example, when the absolute value of the difference between the evaluation values is 0 or less, a score of 2 is given, when the absolute value is 1, a score of 1 is given, and when the absolute value is 2 or more, a score of 0 is given.

In the case of the hamburger shown in FIG. 3, in the recommendation condition "the grade of easiness 3, the grade of lightness 4," that is, in the recommendation condition wherein the attribute value of the item "the grade of easiness" is 3 and the attribute value of the item "the grade of lightness" is 4, the absolute value of the difference between the evaluation values is 1 for the grade of easiness. Hence, a score of 1 is given. Furthermore, since the absolute value of the difference is 2 for the grade of lightness, a score of 0 is given. As a result, the total value 1 is given as the evaluation value.

Furthermore, even in a case based on a subjective characteristic amount, when just a qualitative attribute value such as "easiness" is provided as content data, instead of the quantitative amount "the grade of lightness 4" in FIG. 3, it is needless to say that the method based on the coincidence of items can be used, just as in the embodiment of the present invention.

In the case when an attribute value is a qualitative value, instead of using a method wherein evaluation values are added depending on the complete coincidence of attribute values, it may be possible to use a method wherein a thesaurus in which similarity between attribute values has been defined beforehand so that an evaluation value can be provided in accordance with the similarity, even when the attribute value of each of content data does not completely coincide with the attribute value of a recommendation condition.

In other words, the thesaurus is a list of words classified systematically in tree structures. It is thus possible to understand that words belonging to the same category are more similar to one another than those not belonging to the same category with respect to examples and meanings. The categories are divided from a shallow level to a deep level, step by step. For this reason, it is possible to say that the similarity in the case when two different words belong to the same category up to a deep level is higher than the similarity in the case when two different words belong to the same category only up to a shallow level.

Accordingly, for example, when two words used as attribute values belong to the same category up to the first level of the thesaurus, the similarity is set at 0%. When two words belong to the same category up to the second level of the thesaurus, the similarity is set at 20%. When two words belong to the same category up to the third level of the thesaurus, the similarity is set at 40%. When two words belong to the same category up to the fourth level of the thesaurus, the similarity is set at 60%. When two words belong to the same category up to the fifth level or more of the thesaurus, the similarity is set at 80%. When two words coincide completely with each other, the similarity is set at 100%.

When the similarity between attribute values is defined as described above, it is assumed that "exciting" is included in the attribute value corresponding to the item "impression" of the recommendation condition, for example. On the other hand, it is also assumed that "enjoyable" is included as the attribute value corresponding to the item "impression" of content data, but "exciting" is not included. In this case, it is assumed that the similarity between "exciting" and "enjoyable" is obtained by using the thesaurus. In addition, it is also assumed that this similarity is 80%. The obtained similarity is converted into a score by using a rule predetermined to convert the similarity into a score. When it is assumed that the similarity 80% is converted into a score of 5, the evaluation value becomes a score of 5. Furthermore, it is assumed that "delicious" is included in the item "impression" of the content, instead of the attribute value "enjoyable" in the above-mentioned example. In this case, the similarity between "exciting" and "delicious" is obtained by using the thesaurus. It is assumed that this similarity is 60%. The obtained similarity is converted into a score by using the above-mentioned rule for converting the similarity into a score. When it is assumed that the similarity 60% is converted into a score of 3, the evaluation value becomes a score of 3. Hence, the evaluation value of the item "impression" having the attribute value "delicious" becomes lower than the evaluation value of the item "impression" having the attribute value "enjoyable".

It is needless to say that the above-mentioned various methods can be combined as a matter of course. For example, recommendation conditions including a plurality of recommendation conditions, such as "beef, carrot and onion," "cooking time 30 minutes," "the grade of easiness 3, the grade of lightness 4" and "exiting," can be input as recommendation conditions Evaluation values corresponding to these recommendation conditions respectively can be determined by the above-mentioned various methods. A fixed number of contents should only be selected from the contents having high total scores of the respective evaluation values in decreasing order.

With the above-mentioned system configuration and operation, it is possible to accomplish an information recommendation apparatus capable of recommending data conforming to the request of the user from among content data stored in the content database 2. By providing content data having subjective characteristic amounts as attributes in particular, information recommendation can be carried out according to subjective or sensitive recommendation conditions, such as "easy-cooking dish," "light dish" and "enjoyable dish."

In this embodiment, it is explained that a recommendation condition has an item and an attribute value corresponding thereto. However, this does not mean that it is necessary to input the item and the attribute value corresponding thereto without fail when the user inputs the recommendation condition. In other words, when the user inputs a recommendation condition through the terminal, the user occasionally inputs only the attribute values of the item "ingredients," such as "beef, carrot and onion." In this case, GUI displayed on the terminal of the user specifies the item to which the attribute values of the recommendation condition input by the user corresponds. More specifically, the GUI displays a message "Input ingredients you desire." When the user inputs "beef, carrot and onion" in response to the message, the GUI can assume that "beef, carrot and onion" are attribute values corresponding to the item "ingredients." As described above, it is not limited that the user must input an item and an attribute value corresponding thereto as one set. However, when the information recommendation apparatus of this embodiment performs processing internally, an item and an attribute value corresponding thereto are represented as one set at all times, since the item corresponding to the attribute value is specified by the above-mentioned GUI and the like.

The recommendation condition input means 3 of this embodiment is an example of condition input means of the present invention. The content recommendation means 4 of this embodiment is an example of recommendation means of the present invention. The content data of this embodiment is an example of contents of the present invention.

Embodiment 2

Next, Embodiment 2 in accordance with the present invention will be described.

Figure 5:
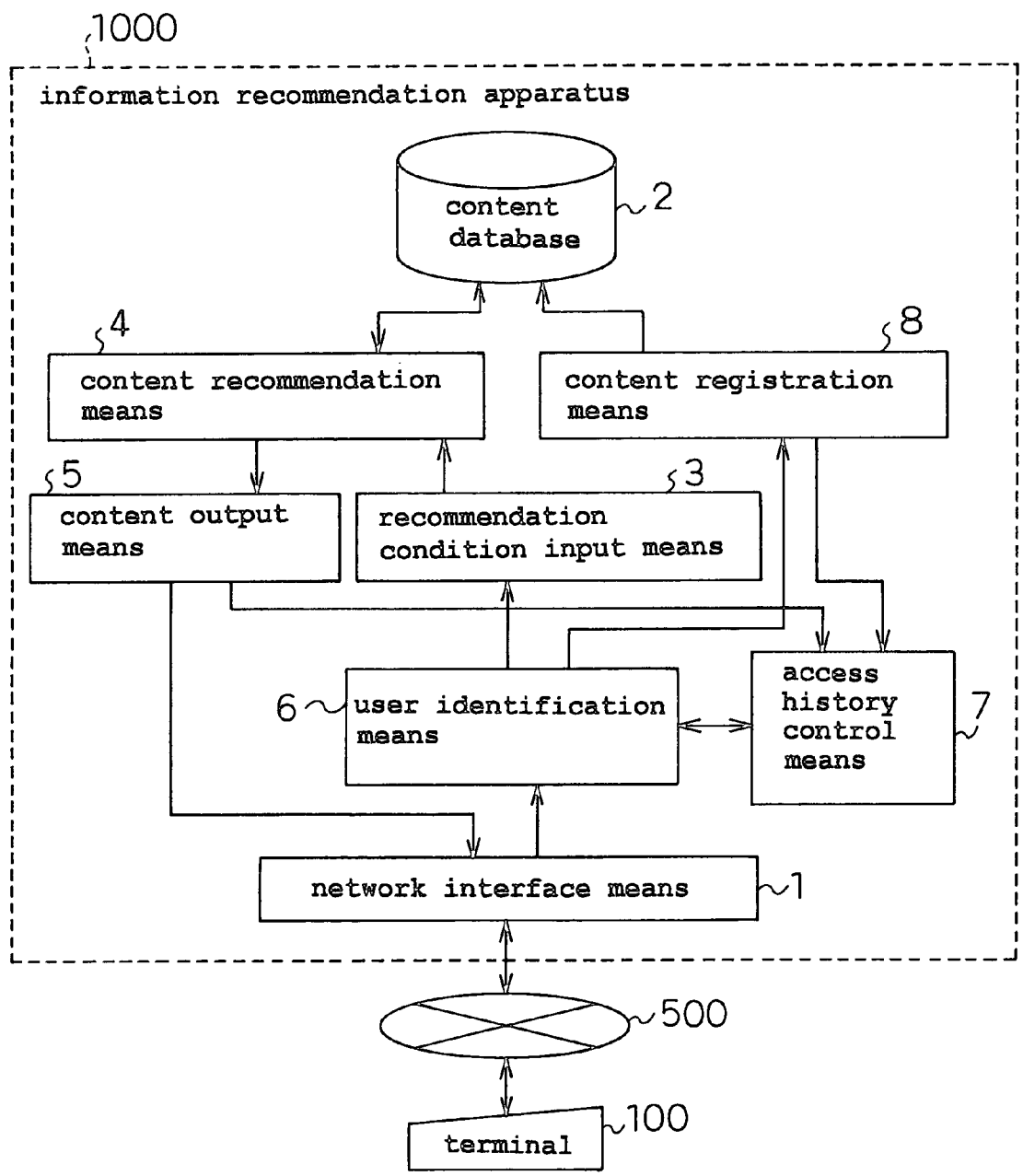
FIG. 5 is a view showing a system configuration in accordance with Embodiment 2 of the present invention.

FIG. 5 is a view showing the system configuration of an information recommendation apparatus 1000 in accordance with Embodiment 2 of the present invention.

The configuration shown in FIG. 5 is obtained by adding user identification means 6, access history control means 7 and content registration means 8 to the system configuration of Embodiment 1 shown in FIG. 1.

In FIG. 5, numeral 1 designates network interface means, numeral 2 designates a content database, numeral 3 designates recommendation condition input means, numeral 4 designates content recommendation means, numeral 5 designates content output means, numeral 6 designates the user identification means of identifying a user who made access at the time of access from a terminal, numeral 7 designates the access history control means of controlling the access history of the user, and numeral 8 designates the content registration means of accepting registration of new contents from the terminal.

Furthermore, since a hardware configuration by which the system configured as described above is operated is basically identical to that of a general-purpose computer system, the explanation of the configuration is omitted.

The operation of the information recommendation apparatus 1000 operating by using the system configured as described above will be explained below.

In this Embodiment, first, the user must register content data before the user receives recommendation of information.

A content data registration procedure will be described below referring to a flowchart shown in FIG. 6.

(Steps B1 and B2)

When the user gains access to the information recommendation apparatus 1000 to register contents by using the terminal 100, the user identification means 6 requests the user to input his or her user ID. If the user has no user ID, it is judged that the user is using the information recommendation apparatus for the first time, and a user ID is issued to the user at step B2.

When the user has his or her user ID, the user inputs the user ID, and the processing sequence advances to step B3.

When the user ID is issued at step B2, a password may also be issued together with the user ID. In this case, the user must input both the user ID and the password at step B1.

(Step B3)

The user registers content data. In the case of a recipe for a dish, the user enters the attribute values corresponding to items, such as "recipe name," "cooking method," "ingredients," "cooking time" and "impression," and registers them.

At the time of the registration, the WWW browser displayed on the display screen of the terminal 100 is used. Filling spaces in a predetermined format enters content data. After the entry, the user presses a "registration" button or the like displayed on the WWW browser, whereby the content registration means 8 registers the content data as new content data in the content database 2. At this time, the content data is endowed with a data ID.

(Step B4)

When the content data is registered at step B3, for the user having the currently registered user ID, the access history control means 7 renews and stores information, such as the date of content data registration, the data ID of the registered data and the quantity of the contents registered by the user.

(Step B5)

It is confirmed as to whether the user registers additional new content data or not. When registration is continued, the processing sequence returns to step B3. When registration is stopped, the sequential registration processing ends.

The user registers content data as described above. By registering content data, the quantity of content data registered in the content database 2 increases, and the history of user registration is renewed at the same time.

As entry items at the time when the user registers content data, various items other than those shown in FIG. 3 can be designated. For example, the weather on the date for taking a meal, the date for taking a meal (the day of the week, Christmas, birthday or other special days), the place for taking a meal, the time period for taking a meal, the person who prepared a meal, the persons who took meals together, cooking utensils used, the degree of cooking by hand, family structure, occupations, the place for buying ingredients, the budget for a meal, the time required for preparing a meal, the ordinary frequency of cooking (how many days in a week), etc. can be designated as objective items.

In addition, various items can also be designated as subjective items. For example, the comfortableness of the weather on the date for taking a meal, the feeling on the date, the physical condition on the date, the reason for selecting a dish, the situation of a meal (taking a meal lonely, lively, specially or enjoyably), the degree of satisfaction at a meal, the reactions of persons having taken meals, the physical condition after eating, the feeling after eating, etc. can be designated as subjective items. Furthermore, items regarding the concept of eating in the background of the user can also be designated. For example, the fondness to eating, the fondness to cooking, important factors in meals (taste, nourishment, healthfulness, budget, easiness, etc.), etc. can be designated. Hence, the user may enter some or all of these items at the time of registration.

Furthermore, as an entry method, the subjective items in particular may be entered qualitatively by using adjectives and the like (for example, "an enjoyable delicious meal"). Alternatively, the subjective items may be entered quantitatively by using adjectives and the grades corresponding to the adjectives (for example, "the grade of pleasure=3," "the grade of deliciousness=5," etc).

Furthermore, the above-mentioned entry items can be classified in view of cause-effect relations in meals, and the items may be entered from this viewpoint.

More specifically, items regarding "why did you select the dish?" or "how was your condition before eating?" are set as entry items. For example, the feeling on the date, the weather on the date, the reason for selecting the dish, the physical condition before eating, etc. can be designated.

Furthermore, items regarding "what happened after eating" are set as entry items. For example, the situation of the meal, the degree of satisfaction at the meal, the reactions of persons having taken the meal, the physical condition after eating, the feeling after eating, etc. can be designated.

Furthermore, the above-mentioned entry items can be classified in view of cause-effect relations in meals, such as from "the viewpoint of the person who prepared the dish" or "the viewpoint of the person who took the dish," and the items may be entered from the viewpoint.

For example, the cooking utensils used to prepare a dish, the place for buying ingredients, etc. are items classified from the viewpoint of the person who prepared the dish. The reason for selecting the dish, the degree of satisfaction at the meal, the physical condition after eating, the feeling after eating and the like are items classified from the viewpoint of the person who took the dish.

Figure 7:
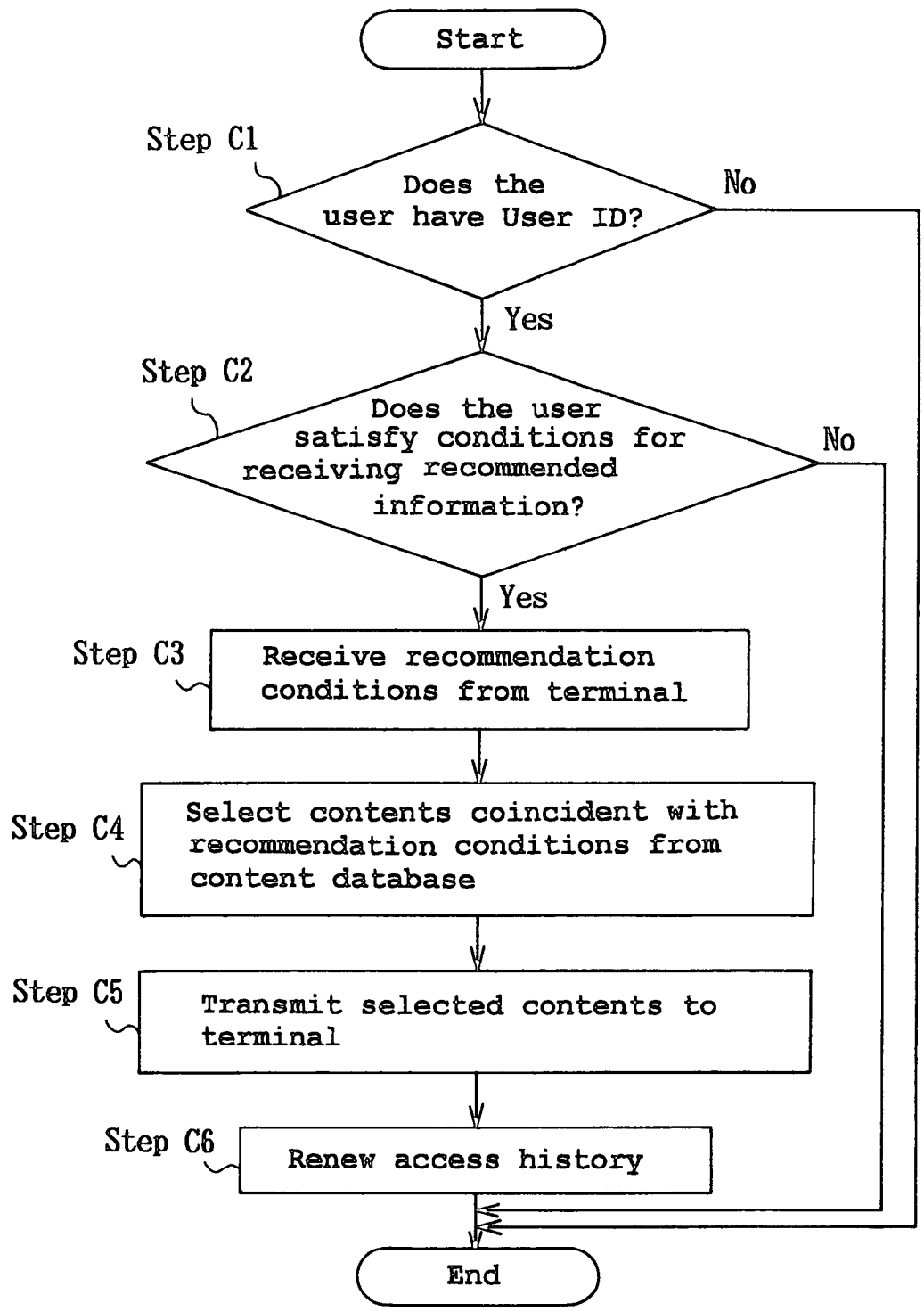
FIG. 7 is a flowchart showing information recommendation operation in accordance with Embodiment 2 of the present invention.

Next, an operation by which the user receives the recommendation of information will be described below referring to a flowchart shown in FIG. 7.

(Step C1)

When the user gains access to the information recommendation apparatus to receive the recommendation of information by using the terminal 100, the user identification means 6 requests the user to input his or her user ID. If the user has no user ID, the user cannot use the recommendation of information, and the processing sequence ends. When the user ID is input and it is judged to be valid, the processing sequence advances to step C2.

At this time, the user identification means 6 may request the user to input his or her password as well as the user ID. In this case, if the password is valid, the processing sequence advances to step C2. If the password is wrong, the processing sequence ends.

(Step C2)

Next, a judgment is made as to whether the user has satisfied a condition for receiving recommended information. The judgment is made by the access history control means 7 depending on the history as to the number of content data registered by the user so far and as to the number of times the user received the recommendation of information so far. For example, it is assumed that a rule wherein the user can receive the recommendation of information five times each time the user registers a piece of content data has been determined beforehand. In this case, when two pieces of content data have been registered according to the user's access history in the access history control means 7, the user has a right to receive the recommendation of information ten times. Hence, if the number of information recommendation times is nine or less, the user satisfies the condition for receiving the recommendation of information, and the processing sequence advances to step C3. If the number of information recommendation times is ten or more, the processing sequence ends.

(Steps C3 to C5)

When the user satisfies the condition for receiving the recommendation of information at step C2, the system accepts a recommendation condition from the user, selects recommended information from the content database 2, and displays the information on the terminal of the user. These procedures are similar to those at steps A1 to A3 in FIG. 2.

The items for the recommendation condition are not limited to the items indicated in FIG. 3. All objective and subjective items registered together with recipe data can be used as conditions. Hence, all the items exemplified in the explanation of recipe registration can be used as recommendation conditions.

Figure 17:
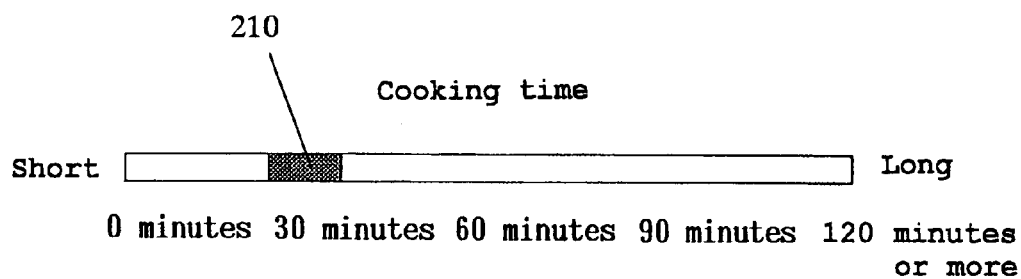
FIG. 17 is a view showing a recommendation condition input interface in accordance with Embodiment 2 of the present invention.

Furthermore, at the time of inputting quantitative recommendation condition items, the user can easily perform input by using an interface having the shape of a slide bar shown in FIG. 17. In FIG. 17, the input interface is configured to have the shape of a slide bar to indicate a cooking time. A portion 210 is moved so as to slide in order to designate a cooking time. In this example, the cooking time becomes shorter as the portion 210 is moved to the left, and becomes longer as the portion 210 is moved to the right. Specific cooking time values are also written as guide values. In FIG. 17, the slide bar indicates exactly 30 minutes. The indication of the guide values may be omitted.

Figure 18:
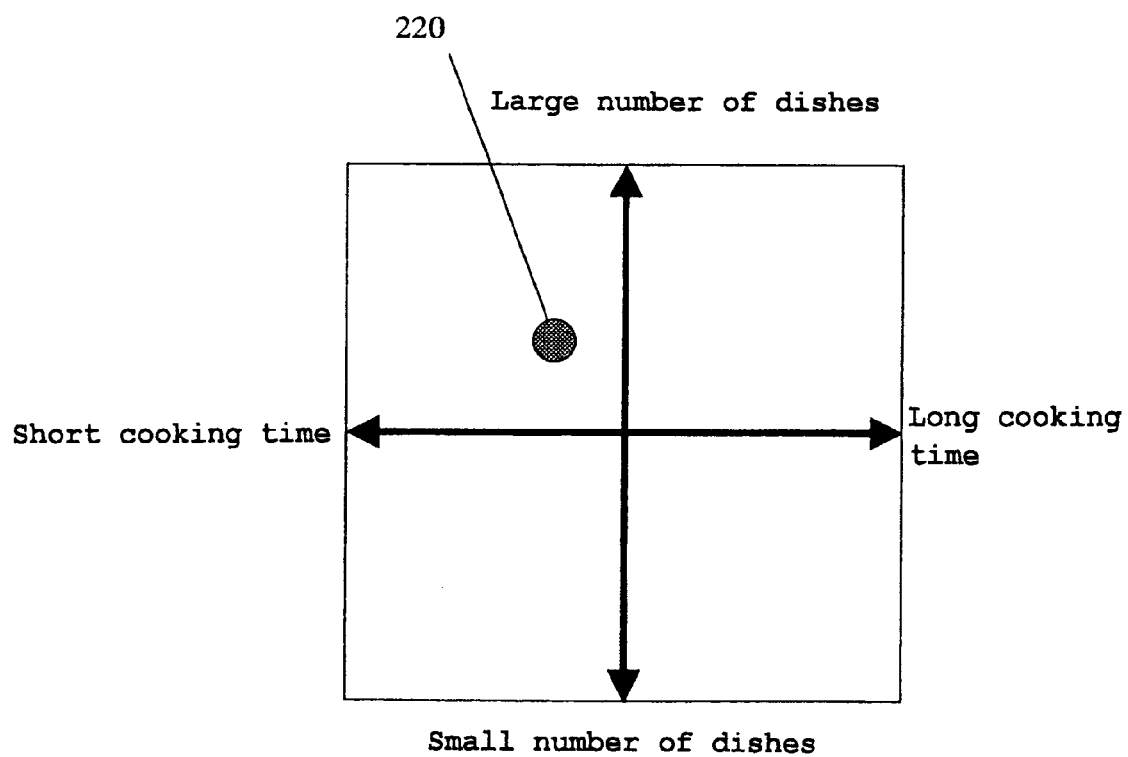
FIG. 18 is a view showing another recommendation condition input interface in accordance with Embodiment 2 of the present invention.

Furthermore, in order to make two qualitative items visually understandable and to make the input of the two qualitative items easy, a two-dimensional plane having two axes for two items is formed as shown in FIG. 18, and the user is requested to designate a place in the plane. Hence, the user can perform input for two items by one operation, whereby the input becomes less burdensome for the user. In FIG. 18, two items, that is, cooking time and the number of dishes, are exemplified, and the abscissa represents cooking time, and the ordinate represents the number of dishes. In this example shown in FIG. 18, unlike FIG. 17, no guide values are written on the axes. However, guide values may be written as a matter of course. When they are not written, the central portion indicates an average value on each of the abscissa and the ordinate. The average value is increased or decreased by moving the place in each of the directions of the abscissa and the ordinate. In FIG. 18, numeral 220 designates a pointer for designating the two-axis values. In this figure, the cooking time is designated to be slightly shorter than the average value, and the number of dishes is slightly larger than the average value.

As these qualitative items, objective items, such as a cooking time, the number of dishes, calories, the cost of ingredients, family structure (the number of family members) and the temperature on the date, can be designated.

Furthermore, if, even among subjective items, items having registered quantitatively in the database, such as the grade of deliciousness, the grade of satisfaction, the grade of pleasure, the grade of heaviness and the grade of refreshment, are registered, for example, as in "the grade of deliciousness=3," the subjective items can also be treated as quantitative items.

In addition, the two items for forming the two-dimensional plane shown in FIG. 18 can be selected arbitrarily from among the above-mentioned quantitative items. Various combinations of the items are made possible.

Even when entry items have been set in view of cause-effect relations before and after eating, items capable of being represented quantitatively can be searched for in a similar way.

Furthermore, if subjective evaluation items (the grade of satisfaction of a dish and the like) have been set as content items, and when a plurality of contents conforming to a designation condition of the user are present, the relative order of the subjective evaluation items should be obtained, and then contents useful (satisfactory) for the user should be recommended as a matter of course.

(Step C6)

When information is recommended at step C5, the access history control means 7 renews and stores information for the current user, such as the date when the recommendation of information is received, the data ID of recommended information and the number of information recommendation times.

With the above-mentioned system configuration and operation, it is possible to accomplish an information recommendation apparatus wherein content data stored in the content database 2 can be made complete and data conforming to the request of the user can be recommended.

In addition, the user is asked to enter objective items and subjective items at the time of content registration. Hence, the user can designate the conditions of registered contents by using the objective items and subjective items, and can receive the recommendation of the contents.

Furthermore, the user is asked to enter subjective evaluation items at the time of content registration. Hence, the relative merits of the registered contents can be determined. By considering this matter at the time of content recommendation, contents having higher merits can be recommended.

Furthermore, the user is asked to enter items regarding cause-effect relations before and after eating at the time of content registration. Hence, the user can designate conditions in view of cause-effect relations of a meal, such as "a dish to be taken when not feeling well" and "a dish giving pleasant feelings after eating," and the user can receive the recommendation of contents.

Furthermore, the user is asked to enter items regarding the person who prepares a dish or the person who eats a dish at the time of registration. Hence, the user can designate conditions from the standpoint of the person who prepares a dish or the person who eats a dish, and can receive the recommendation of registered contents.

Moreover, the user can search for contents easily with an interface capable of making input easy by using registration items that can be made quantitative.

In this embodiment, as a condition of receiving recommended information, information recommendation can be received five times for one piece of content data. However, the present invention is not limited to this. This condition can be set as desired. For example, to attract attention of the user, the condition may be set so that recommended information can be obtained for the first two times even when no content data has been registered.

Furthermore, in this embodiment, a judgment is made as to whether the user has satisfied a condition for receiving recommended information. This judgment is made by the access history control means 7 depending on the history as to the number of content data registered by the user so far and as to the number of times the user received the recommendation of information so far. However, the present invention is not limited to this. Content data may be endowed with the user ID of a person who registered the content data, and the judgment may be made by using the user ID.

Embodiment 3

Next, Embodiment 3 will be described below.

Figure 8:
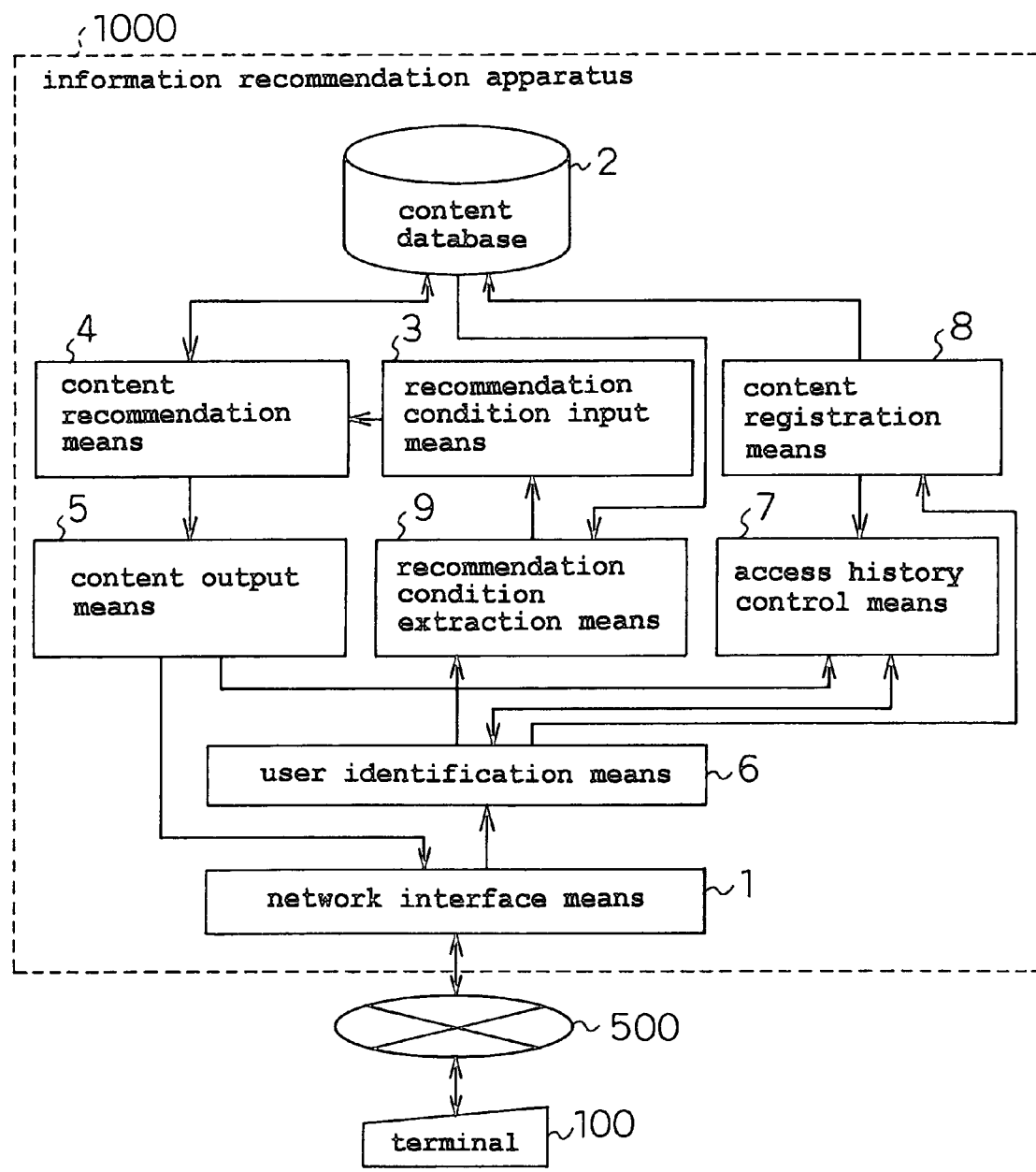
FIG. 8 is a view showing a system configuration in accordance with Embodiment 3 of the present invention.

FIG. 8 is a view showing the system configuration of an information recommendation apparatus 1000 in accordance with this embodiment.

The configuration shown in FIG. 8 is obtained by adding recommendation condition extraction means 9 to the system configuration of Embodiment 2 shown in FIG. 5.

In FIG. 8, numeral 1 designates network interface means, numeral 2 designates a content database, numeral 3 designates recommendation condition input means, numeral 4 designates content recommendation means, numeral 5 designates content output means, numeral 6 designates user identification means, numeral 7 designates access history control means, and numeral 8 designates content registration means, and numeral 9 designates the recommendation condition extraction means of extracting recommendation conditions from content items and attribute values registered previously by the user.

Furthermore, since a hardware configuration by which the system configured as described above is operated is basically identical to that of a general-purpose computer system, the explanation of the configuration is omitted.

The operation of the information recommendation apparatus operating by using the system configured as described above will be explained below. In the following description, a dish recommendation system is taken as an example just as in the case of Embodiment 1.

In this Embodiment, first, the user must register content data before the user receives the recommendation of information just as in the case of Embodiment 2.

Figure 6:
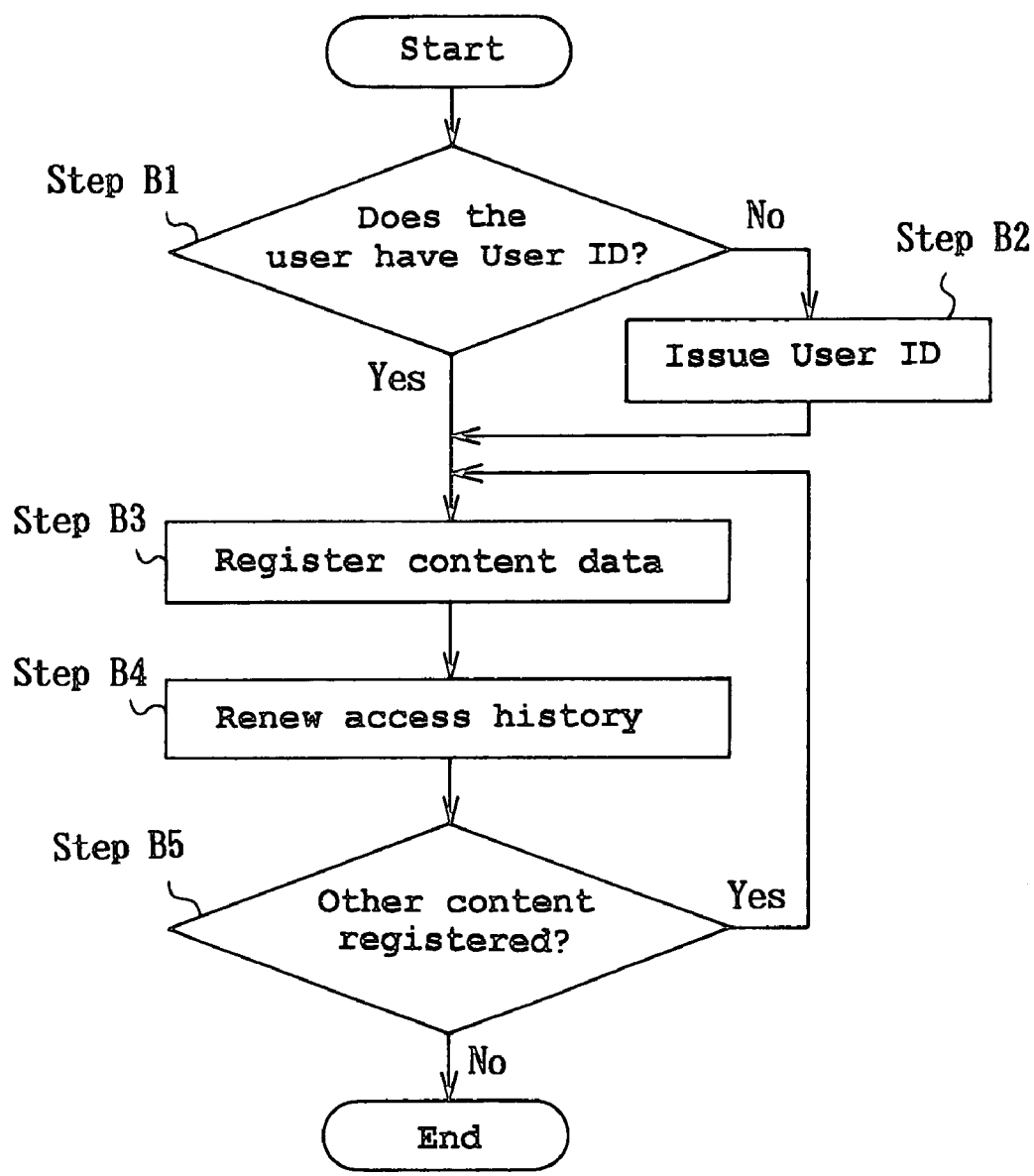
FIG. 6 is a flowchart showing registration operation in accordance with Embodiment 2 of the present invention.

Since the content data registration procedure in accordance with this embodiment is similar to that in accordance with Embodiment 2 shown in FIG. 6, its explanation is omitted.

Figure 9:
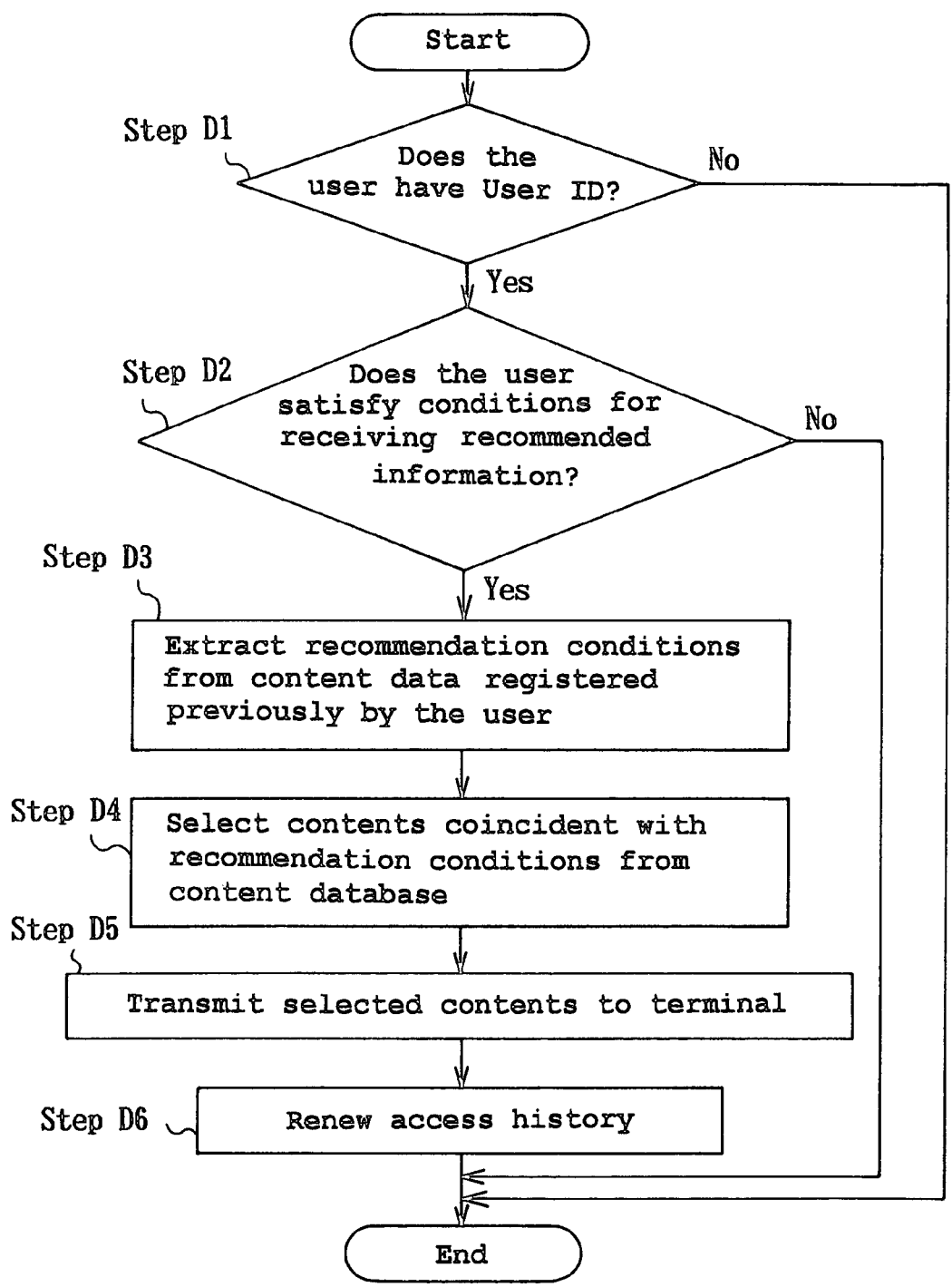
FIG. 9 is a flowchart showing operation in accordance with Embodiment 3 of the present invention.

Next, an operation for the user to receive information recommendation will be described below referring to a flowchart shown in FIG. 9.

(Steps D1 and D2)

When the user issues a request for information recommendation to the information recommendation apparatus by using the terminal 100, a check is made as to whether conditions for having the approval of the user ID and for receiving recommended information have been satisfied or not by the user identification means 6. In this embodiment, it is essential that the user who wishes to receive recommended information must register content data beforehand. If the conditions are not satisfied, the processing ends. The operations at steps D1 and D2 are similar to those at steps C1 and C2 in FIG. 7.

(Step D3)

Next, the recommendation condition extraction means 9 extracts recommendation conditions from the content data registered previously by the current user. The access history control means 7 has information indicating the kind of content data registered in the past by the user. Therefore, to extract the recommendation conditions, the ID of the content data registered previously in the content database 2 by the user is read from the access history control means 7, and the content data corresponding to the data ID is referred to in the content database 2.

Since the content data has a format shown in FIG. 3, the tendencies of data registered so far can be extracted depending on various items and attribute values. For example, when attention is paid to the item "ingredients," the tendencies of ingredients cooked by the user can be known by obtaining statistics on the ingredients in the content data registered by the user, that is, by obtaining the occurrence frequencies thereof.

The data in a vector form represented by the set of the ingredient names and the occurrence frequencies obtained as described above is referred to as user characteristic information indicating the tendencies of the user. In other words, more specifically, the user characteristic information is information comprising items, attribute values and the occurrence frequencies of the attribute values.

FIG. 10 indicates an example of the user tendencies obtained as described above. The names of ingredients are written on the left, and the values on the right indicate the occurrence frequencies of the names. Furthermore, FIG. 10 also indicates the user tendencies with respect to cooking time, calories, etc., as well as the tendencies of the ingredients. In addition, the occurrence frequencies are normalized, and the attribute values such as ingredients names and the like are arranged in decreasing order of occurrence frequencies. When explanation is given while attention is paid to ingredients, in the case of this example, it can be understood that the user is fond of dishes consisting of pork, onion and cabbage in this order.

For this reason, the names of the ingredients "pork, onion, cabbage, . . . , " are selected as recommendation conditions.

When the current user selects content data registered previously by the user, in accordance with the data ID of the data registered by the user and recorded in the access history control means 7 described above, data corresponding to the data ID is referred to. Instead of this method, as shown in FIG. 11, it is possible to use a method wherein a registrant ID is assigned to content data at the time of registration, and data having the registrant ID coincident with the user ID of the current user is selected from among content data registered in the content database 2.

(Step D4 to D5)

Recommended information is selected from the content database 2 in accordance with the recommendation conditions extracted at step D3, and is displayed on the terminal of the user. The procedures for these operations are similar to those at steps A2 to A3 in FIG. 2.

(Step D6)

When information is recommended at step D5, the access history control means 7 renews and stores information on the current user, such as the date when information recommendation is received, the data ID of the recommended information and the number of times the user received information recommendation.

In this embodiment, when extracting recommendation conditions at step D3, the extraction is performed in accordance with the occurrence frequency of each attribute value corresponding to the item "ingredients." However, the following method may be used. That is, words are picked out from the attribute value of the item "cooking method" comprising free sentences. Words regarding cooking methods, such as "broiling" and "boiling," and words regarding cooking utensils, such as "pan" and "kettle," are found out. According to the occurrence frequencies of the words, tendencies of cooking methods conducted frequently may be found out, whereby recommendation conditions ("broiled food," "boiled food," etc.) based on them may be extracted.

Furthermore, tendencies of cooking time longer or shorter than an average and tendencies of calories lower or higher than an average may be found out from quantitative values indicated by the attribute values corresponding to objective items, such as "cooking time" and "calories," whereby the recommendation conditions based on them may be extracted.

Furthermore, tendencies of frequently having easily cooked dishes or heavy dishes may be found out from the attribute values corresponding to subjective characteristic amount items, such as "the grade of easiness" and "the grade of heaviness," whereby the recommendation conditions based on them may be extracted.

Furthermore, each piece of data registered in the content database 2 may be endowed with a content characteristic vector beforehand according to the occurrence frequencies of keywords, such as ingredients. Furthermore, the inner product of the vector and the user characteristic information regarding the user may be obtained from the past registration content data of the user as described already, whereby information to be recommended may be determined according to content information having high inner products.

Furthermore, when generating user characteristic information, the information of contents recommended to the user and selected by the user in the past may be also included in addition to the contents registered in the past by the user. Alternatively, the information of the contents recommended to the user in the past may also be considered.

Furthermore, the system configuration may be additionally provided with a user characteristic information database 12 wherein the user characteristic information of each user is obtained each time the user newly registers contents and the result is stored. When the user characteristic information is required at the time when receiving information recommendation, the user characteristic information database 12 may be referred to.

These may be combined and the recommendation conditions based on them may be extracted as a matter of course.

Furthermore, the above-mentioned recommendation conditions automatically obtained from the past history of the user may be combined with conditions specifically added by the user.

For example, when the user specifies "beef," only the contents including beef may be selected from the content database 2, and recommendation may be performed further from among the selected contents by the selection method using the user characteristic information explained already.

With the above-mentioned system configuration and operation, it is possible to accomplish an information recommendation apparatus wherein content data stored in the content database 2 can be made complete and appropriate data suited for the user can be recommended while the user is not required to input specific recommendation conditions.

In this embodiment, when recommendation conditions are extracted at step D3, the tendencies of dishes favorably cooked by the user are extracted according to the occurrence frequencies of ingredients and they are used as recommendation conditions. However, tendencies different from the tendencies of dishes favorably cooked by the user may also be used intentionally as recommendation conditions. For example, when the tendencies with respect to ingredients shown in FIG. 10 are present, ingredients having low occurrence frequencies are extracted intentionally as recommendation conditions. Alternatively, ingredients having no occurrence frequency are extracted as recommendation conditions.

As a result, it is expected that the recipes of dishes not cooked usually by the user be recommended, whereby it is possible to perform unexpected information recommendation.

Whether recommendation conditions for reasonable recommendation or recommendation conditions for unexpected recommendation are extracted depends on the character of the system. Either of them may be used.

Recommendation viewpoint selection means (not shown) may be added to the system configuration of FIG. 8, whereby the system may be configured so as to allow the user to select a viewpoint regarding information recommendation.

For example, at the time of requesting information recommendation, the user himself or herself is allowed to select "reasonable recommendation" or "unexpected recommendation." Depending on this selection, a determination is made as to whether recommendation conditions for reasonable recommendation or recommendation conditions for unexpected recommendation are extracted. This configuration may also be used.

In this embodiment, user characteristic information and content characteristic information are defined depending on attribute values and the occurrence frequencies of the attribute values. However, the information should only be defined depending on attribute values and concepts indicating "the weights of the attribute values." The occurrence frequency is an example thereof. As another example, a keyword weight definition method referred to as TF.IDF is available for example.

Furthermore, it is possible to use an interface using a plane formed of two axes as shown in FIG. 18. In this case, the contents registered in the past by the user are specified according to the user ID input first. According to the specified contents, the average cooking time and the number of dishes for the user can be obtained. In other words, the center values in FIG. 18 change depending on the user, whereby search conditions suited for the user can be set.

Similarly, the maximum and minimum values in FIG. 18 can also be set dynamically depending on the contents registered by the user.

For example, it is assumed that a user has carried out content registration 10 times so far, and that the average of cooking time is 60 minutes, the minimum value is 30 minutes, and the maximum value is 90 minutes. In this case, the center of the cooking time axis is set at 60 minutes, the left end is set at 30 minutes, and the right end is set at 90 minutes.

Furthermore, it is assumed that another user has ever carried out content registration 20 times so far, and that the average of cooking time is 90 minutes, the minimum value is 30 minutes, and the maximum value is 150 minutes. The center of the cooking time axis, the left end and the right end are set at the above-mentioned values, respectively. Similar settings are done for the axis (ordinate) for the number of dishes.

Hence, it is possible to set appropriate search ranges suited for the actual situations of each user.

It is explained that the center value of each axis is the average of a registered content. However, the most frequent value may be used instead of the average.

The recommendation condition extraction means of this embodiment is an example of the condition extraction means of the present invention.

Embodiment 4

Next, Embodiment 4 will be described.

Figure 12:
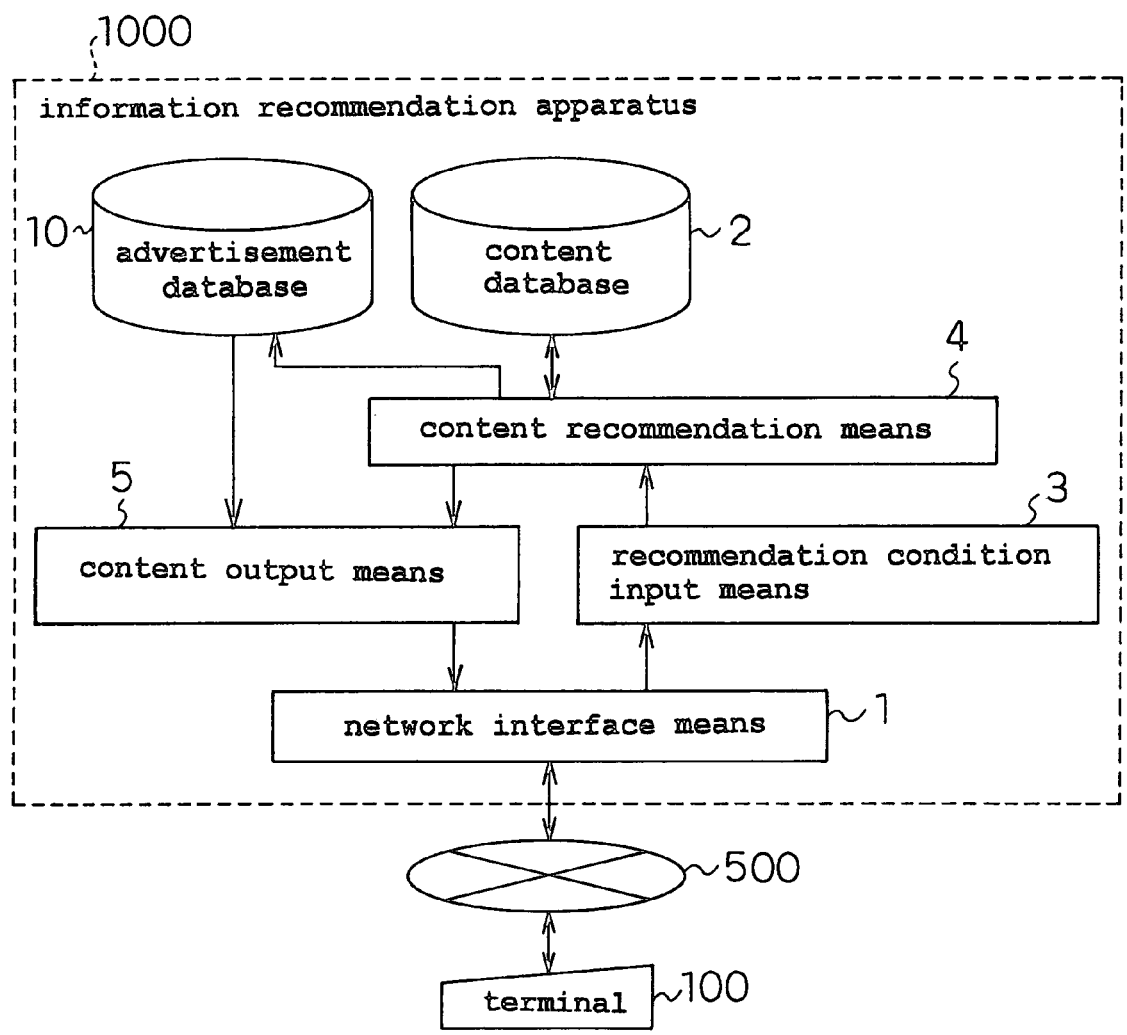
FIG. 12 is a view showing a system configuration in accordance with Embodiment 4 of the present invention.

FIG. 12 is a view showing the system configuration of an information recommendation apparatus in accordance with Embodiment 4.

The configuration shown in FIG. 12 is obtained by adding an advertisement database 10 to the system configuration of Embodiment 1 shown in FIG. 1.

In FIG. 12, numeral 1 designates network interface means, numeral 2 designates a content database, numeral 3 designates recommendation condition input means, numeral 4 designates content recommendation means, numeral 5 designates content output means, and numeral 10 designates advertisement database for providing advertisement data.

Furthermore, since a hardware configuration by which the system configured as described above is operated is basically identical to that of a general-purpose computer system, the explanation of the configuration is omitted.

Figure 13:
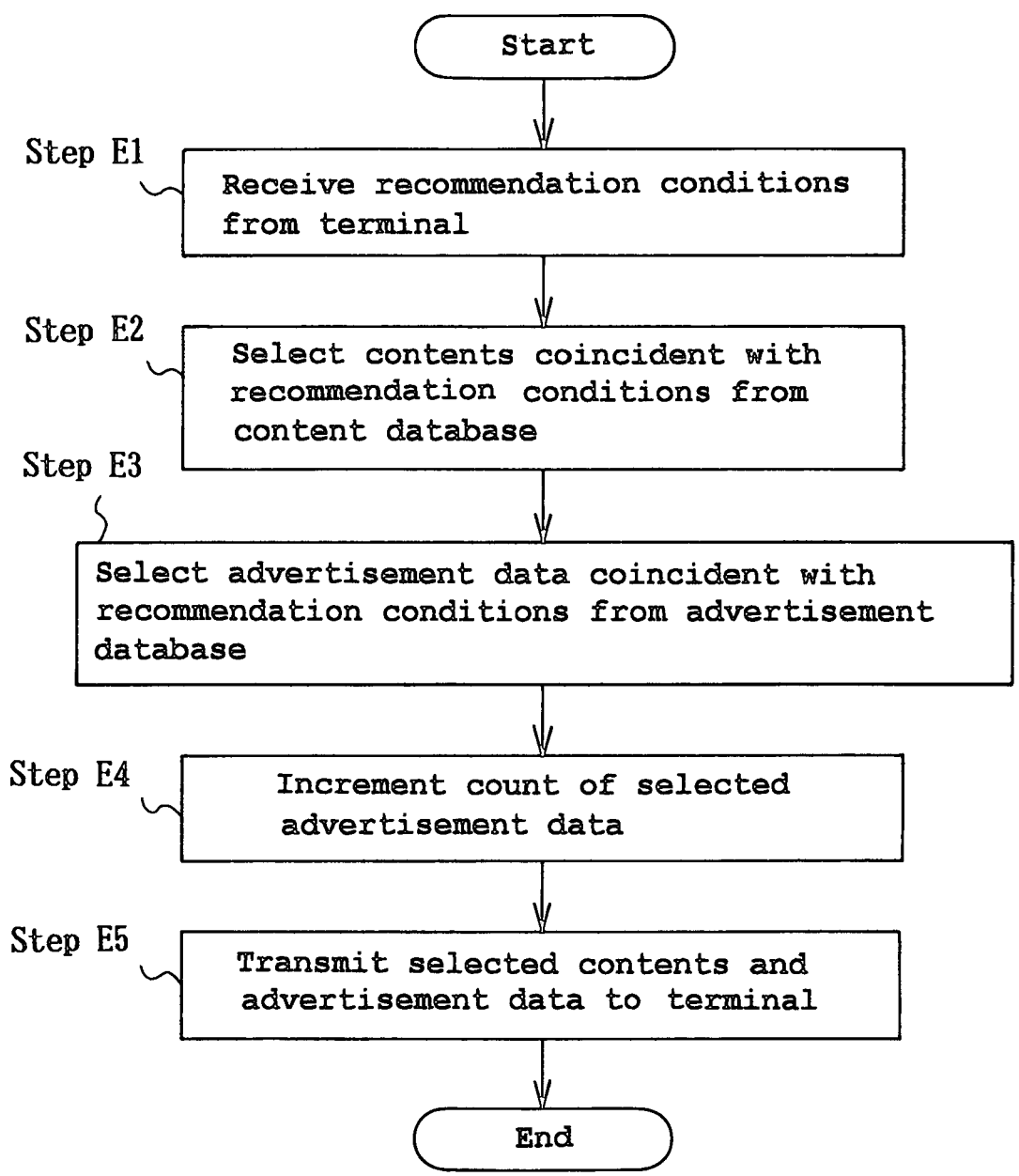
FIG. 13 is a flowchart showing operation in accordance with Embodiment 4 of the present invention.

The operation of the information recommendation apparatus operating by using the system configured as described above will be explained below. In the following description, a dish recommendation system is taken as an example just as in the case of Embodiment 1 and explained referring to a flowchart shown in FIG. 13.

(Step E1)

Recommendation conditions input by the user through the terminal 100, that is, items and the attribute values corresponding thereto, are transmitted via the Internet 500 and received by the information recommendation apparatus. This step is the same as step A1 in FIG. 2 in FIG. 2.

(Step E2)

The contents conforming to the recommendation conditions received at step E1 are selected from the content database 2 by the content recommendation means 4. This step is also the same as step A2 in FIG. 2. The method of selecting specific contents is similar to that described at the step.

(Step E3)

The content recommendation means 4 selects advertisement data conforming to the recommendation conditions input at step E1 from the advertisement database 10. The advertisement data has been registered in the advertisement database 10 in a format shown in FIG. 14. In FIG. 14, "data ID" designates an inherent number assigned to the advertisement data, "counter" designates a value indicating the number of times this advertisement is transmitted together with recommended information to the terminal 100, "advertisement" designates the content of the advertisement, and "related information" designates characteristic amounts characterizing the advertisement. The format of "related information" is similar to the format of content data in the content database 2. In other words, just like the format of content data, the "related information" comprises a plurality of items and the attribute values corresponding to the items. For example, in the "related information" shown in FIG. 14, "ingredients" is an item, and "beef" is an attribute value corresponding to the item "ingredients." In addition, "price" is an item, and "low" is an attribute value corresponding to the item "price."

Just as in the case of step E2 (step A2), evaluation values based on the degree of coincidence between recommendation conditions and the attribute values of "Related information" are obtained for all the advertisement data stored in the advertisement database 10. The advertisement data having the highest evaluation value is then selected.

(Step E4)

Regarding the selected advertisement data, the content recommendation means 4 increments the value of "counter," shown in FIG. 14, by one.

(Step E5)

The content (recipe data) selected at step E2 and the advertisement data selected at step E3 are transmitted to the terminal 100 via the content output means 5 and the network interface 1, and the content and list thereof are displayed on the display screen of the terminal 100. An example of such a specific display is shown in FIG. 16. Recipes and an advertisement 200 are displayed on a WWW browser.

Both text data and image data may be used as the advertisement data for "advertisement" shown in FIG. 14. When the advertisement is text data, the portion of the advertisement 200 in the display example of FIG. 16 becomes text. When the advertisement is image data, the portion of the advertisement 200 becomes the so-called banner advertisement formed of images.

In the display example of FIG. 16, the advertisement 200 may be linked to the home page of its advertiser.

Specific examples of advertisement data are information for providing sample products, information on prizes, information on ingredients, information on cooking utensils, information on restaurants, information on related retail stores, information on related WEB sites, etc.

As a method of selecting advertisement information, regardless of recommendation conditions, selection may be carried out on the basis of user characteristic information by comparing the user characteristic information with the characteristic amounts of advertisement information, that is, the attribute values corresponding to the items in the "related information." Alternatively, selection may be carried out in consideration of both the user characteristic information and recommendation conditions.

With the above-mentioned system configuration and operation, content data conforming to the recommendation conditions can be recommended, and an advertisement corresponding to the data can be shown. In addition, it is possible to perform control to find out which advertisement is displayed and how many times the advertisement is displayed. Hence, it is possible to charge the advertiser of the advertisement an advertisement rate depending on the number of times.

In the above-mentioned Embodiment 1 to Embodiment 4, recipes for dishes are exemplified as content data. However, the present invention is not limited to this, but can be applied to various contents.

In the above-mentioned Embodiment 1 to Embodiment 4, the request of information recommendation, the input of recommendation conditions, the registration of new content data, the display of recommended content data, etc. are explained by taking examples using a WWW browser. However, the present invention is not limited to this, but may be configured so that another means, such as electronic mail, may be used to transmit such information between the terminal 100 and the information recommendation apparatus 1000.

The content recommendation means 4 of this embodiment is used as an example of the advertisement specifying means of the present invention. The counter of this embodiment is used as an example of the advertisement counter of the present invention.

Embodiment 5

Next, Embodiment 5 will be described.

Figure 19:
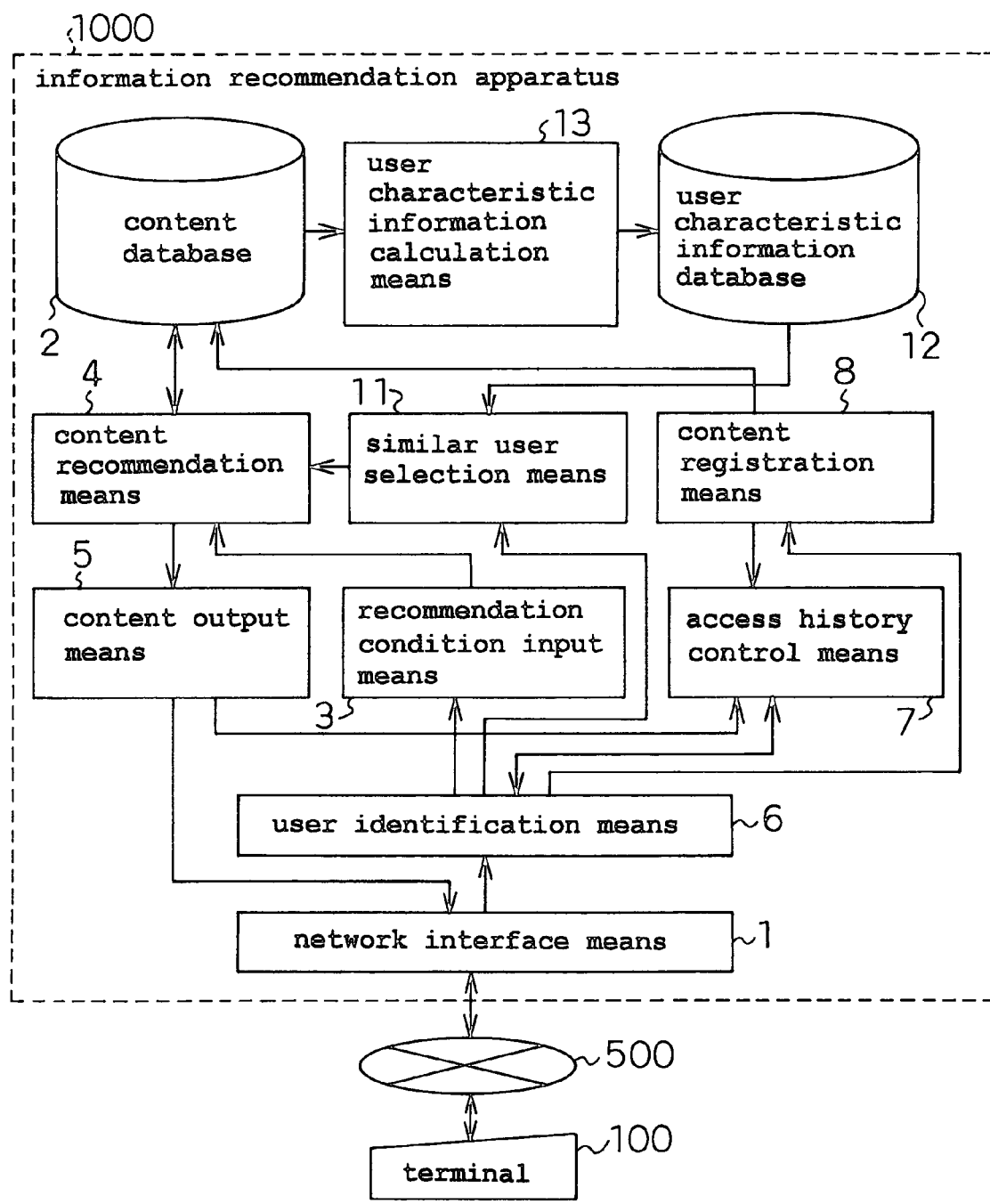
FIG. 19 is a view showing a system configuration in accordance with Embodiment 5 of the present invention.

FIG. 19 is a view showing the system configuration of an information recommendation apparatus in accordance with Embodiment 5.

The configuration shown in FIG. 19 is obtained by adding similar user selection means 11 to the system configuration of Embodiment 2 shown in FIG. 5.

In FIG. 19, numeral 1 designates network interface means, numeral 2 designates a content database, numeral 3 designates recommendation condition input means, numeral 4 designates content recommendation means, numeral 5 designates content output means, numeral 6 designates user identification means, numeral 7 designates access history control means, numeral 8 designates content registration means, numeral 13 designates user characteristic information calculation means of obtaining user characteristic information indicating the tendencies of the content data input in the past by the user by calculation, numeral 12 designates a user characteristic information database for storing vectors obtained by the user characteristic information obtaining means 13, and numeral 11 designates the similar user selection means 11 of selecting other users similar to the user attempting to receive information recommendation.

Furthermore, since a hardware configuration by which the system configured as described above is operated is basically identical to that of a general-purpose computer system, the explanation of the configuration is omitted.

The operation of the information recommendation apparatus operating by using the system configured as described above will be explained below. In the following description, a dish recommendation system is taken as an example just as in the case of Embodiment 1.

In this Embodiment, first, the user must register content data before the user receives the recommendation of information just as in the case of Embodiment 2.

The content data registration procedure in accordance with this embodiment is similar to that in accordance with Embodiment 2 shown in FIG. 6.

Figure 20:
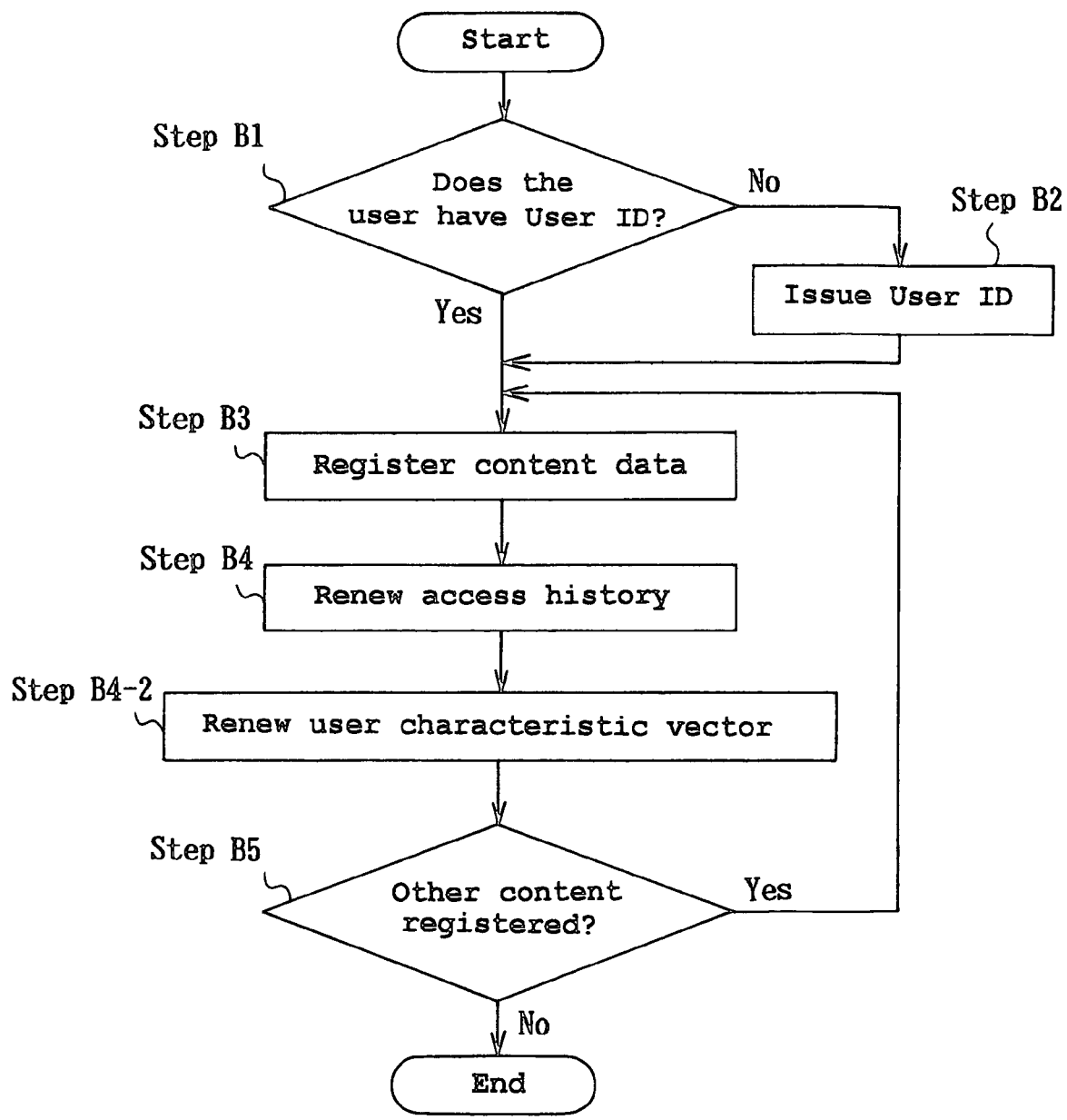
FIG. 20 is a flowchart showing registration operation in accordance with Embodiment 5 of the present invention.

FIG. 20 shows the procedure. In this procedure, new step B4-2 is added between step B4 and step B5 in FIG. 6.

In other words, contents are registered in accordance with a procedure similar to that shown in FIG. 6. User access history is renewed at step B4. At step B4-2, by referring to the content data registered by the user so far from the content database 2, the user characteristic information is renewed and registered in the user characteristic information database 12.

The method of specifically generating and renewing the user characteristic information is the same as that explained in Embodiment 3. For example, only the data registered by the user is selected from among the data registered in the content database 2. The names of the ingredients occurred in the registered data and the frequencies of the occurrences are counted, and the frequencies are normalized. As a result, the format shown in FIG. 10 is obtained.

The user characteristic information additionally including newly registered content data is renewed by a similar procedure.

By the above-mentioned procedure, the content data is registered, and the user characteristic information is also generated and renewed simultaneously.

The generation and renewal of the user characteristic information are not necessarily required to be carried out at the time of the registration of the content data. When the content data is registered, the registration may be carried out according to the procedure shown in FIG. 6, and when the load on the information recommendation system is relatively low, the renewal operation of the user characteristic information, that is, only the operation at step B4-2 in FIG. 20, may be carried out.

Figure 21:
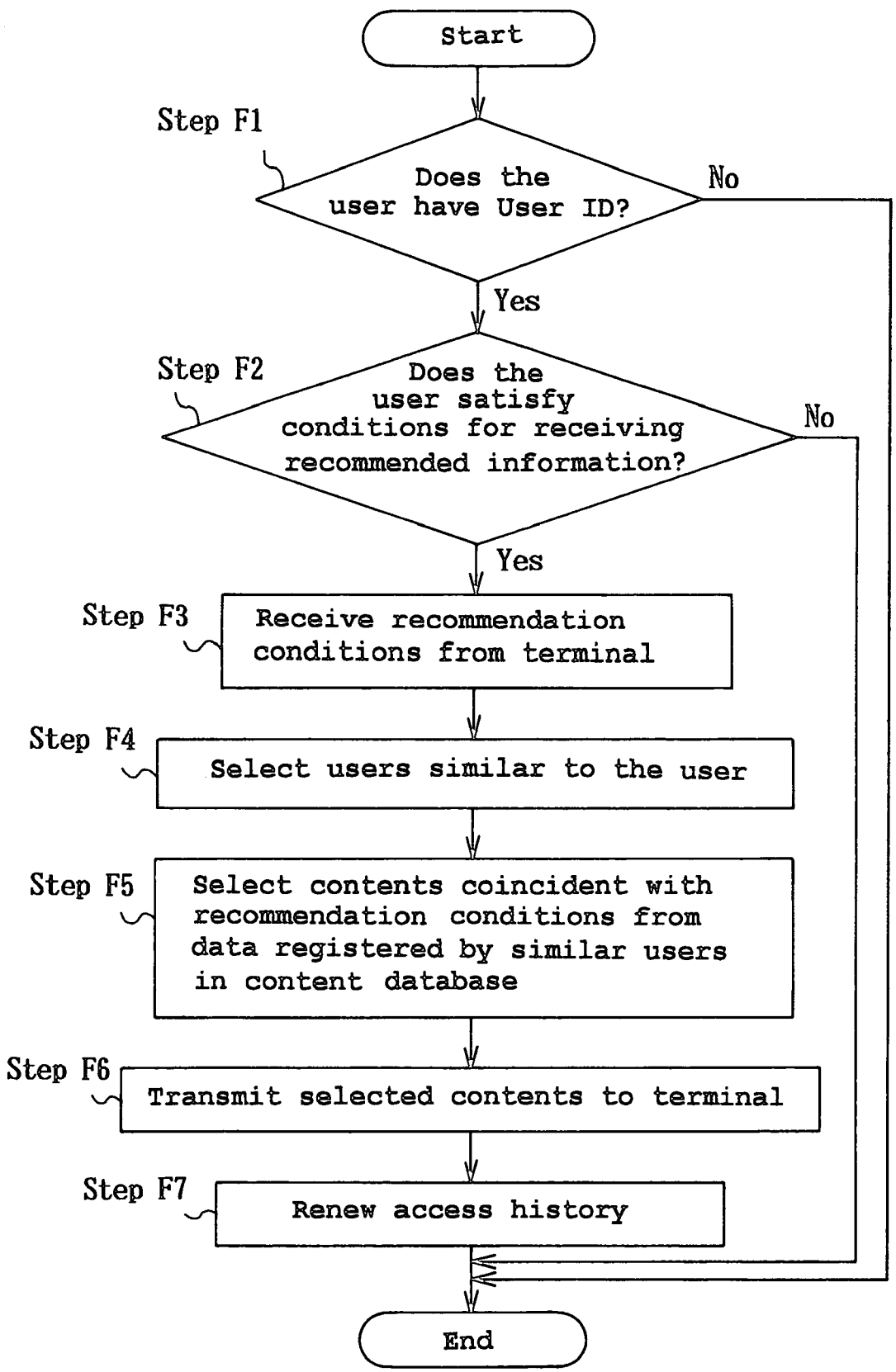
FIG. 21 is a flowchart showing information recommendation operation in accordance with Embodiment 5 of the present invention.

Next, an operation for the user to receive information recommendation will be described below referring to a flowchart shown in FIG. 21.

(Steps F1 and F2)

When the user issues a request for information recommendation to the information recommendation apparatus by using the terminal 100, a check is made as to whether conditions for having approval of the user ID and for receiving recommended information have been satisfied or not. In this embodiment, it is essential that the user who wishes to receive recommended information must register content data beforehand. If the conditions are not satisfied, the processing ends.

If the conditions for receiving information recommendation are satisfied at step F2, the recommendation conditions are accepted from the user. This operation is similar to that at steps C1 to C3 in FIG. 7.

(Step F4)

Next, users similar to the current user are selected as described below. By referring to the user characteristic information database 12 via the user ID, it is possible to refer to the user characteristic information of the user. This user characteristic information has a format shown in FIG. 10 as explained already.

The similar user selection means 11 compares the user characteristic information of the user with the user characteristic information of other users in the user characteristic information database 12 and selects similar users. As an example of a specific selection method, the inner products of the vector of the user and the vectors of other users are obtained, and the vectors of users having high inner products are selected. By this method, at least one or more other users are selected.

(Step F5)

Among all content data in the content database, the data registered by the users selected at step F4 is selected depending on the recommendation conditions accepted at step F3.

As a specific recommendation data selection method, a procedure similar to that used at steps A21 to A24 shown in FIG. 4 and described already in the explanation of Embodiment 1 can be used. Alternatively, as described already in the explanation of Embodiment 3, content data may be endowed with content characteristic vectors, and a determination may be made by comparing the user characteristic information of the user who requested recommendation with the content characteristic vectors.

(Steps F6 and F7)

The recommended information determined at step F5 is displayed on the terminal of the user. The access history control means 7 renews and stores information on the current user, such as the date when information recommendation is received, the data ID of the recommended information and the number of times the user received information recommendation.

In this embodiment, the following selection method may be used. When information to be recommended is determined at step F5, a confirmation is made as to whether the user attempting to receive recommendation has ever received the information to be recommended and selected the information or not, by referring to the content database 2, whereby only the unselected content data can be selected.

At the time of inputting recommendation conditions, the interface shown in FIG. 17 or FIG. 18 may be used as described already in the explanation of Embodiment 2.

Furthermore, at the time of generating user characteristic information, in addition to using contents registered by the user in the past, it may be possible to consider content data information recommended to the user and selected by the user in the past. In other words, each time the user received the recommendation of content data and selected the recommended content data in the past, the user characteristic information of the user may have been obtained by calculation. Alternatively, it may be possible to consider content data information recommended to the user in the past. In other words, each time the user received content recommendation in the past, the user characteristic information of the user may have been obtained by calculation.

Furthermore, the following method may also be used. While no specific recommendation condition is input by the current user, only the user ID is accepted, other users having user characteristic information similar to that of the current user are selected. Even when the user attempting to receive recommendation simply selects and indicates recommended data or data that was recommended to the user but not selected by the user from the contents registered by the selected other users, the contents are well worth recommendation, because the contents are those registered by the other users having similar preferences. Hence, this simplified method may also be used.

With the above-mentioned system configuration and operation, it is possible to accomplish an information recommendation apparatus wherein content data stored in the content database 2 can be made complete and content data registered by users having similar preferences can be recommended.

The user characteristic information calculation means 13 of this embodiment is an example of characteristic calculation means of the present invention, and the user characteristic information of this embodiment is an example of a user characteristic of each item in the present invention.

Embodiment 6

Next, Embodiment 6 will be described below.

Figure 22:
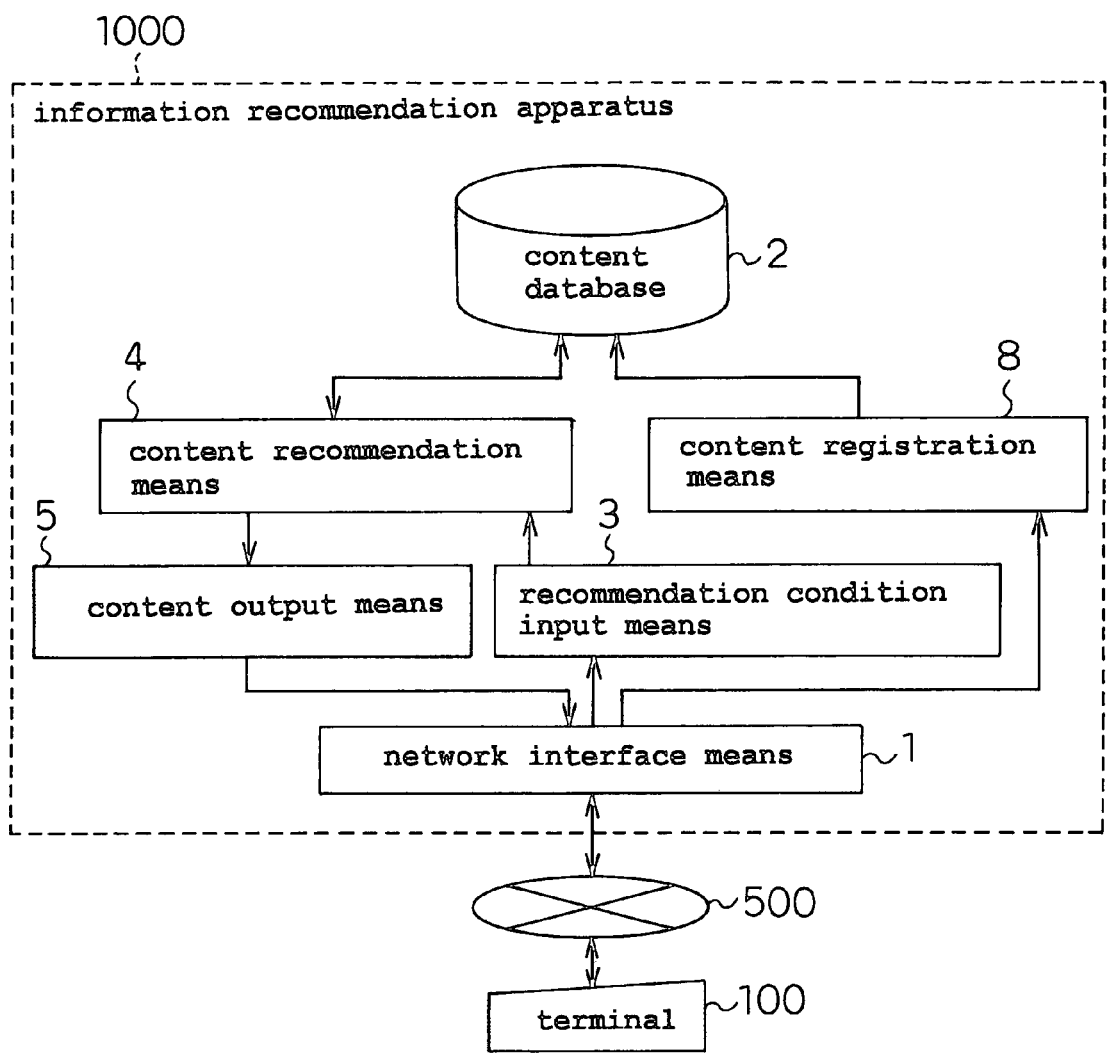
FIG. 22 is a view showing a system configuration in accordance with Embodiment 6 of the present invention.

FIG. 22 is a view showing the system configuration of an information recommendation apparatus in accordance with Embodiment 6. This configuration is obtained by adding content registration means 8 to the system configuration of Embodiment 1.

The format of the data registered in the content database 2 is similar to that shown in FIG. 3.

Although Embodiment 6 is similar to Embodiment 1 as described above, Embodiment 6 can have new effects by changing the recommendation condition acceptance method and the search method of Embodiment 1. The operations in this embodiment will be described below.

Furthermore, since a hardware configuration by which the system configured as described above is operated is basically identical to that of a general-purpose computer system, the explanation of the configuration is omitted.

Figure 23:
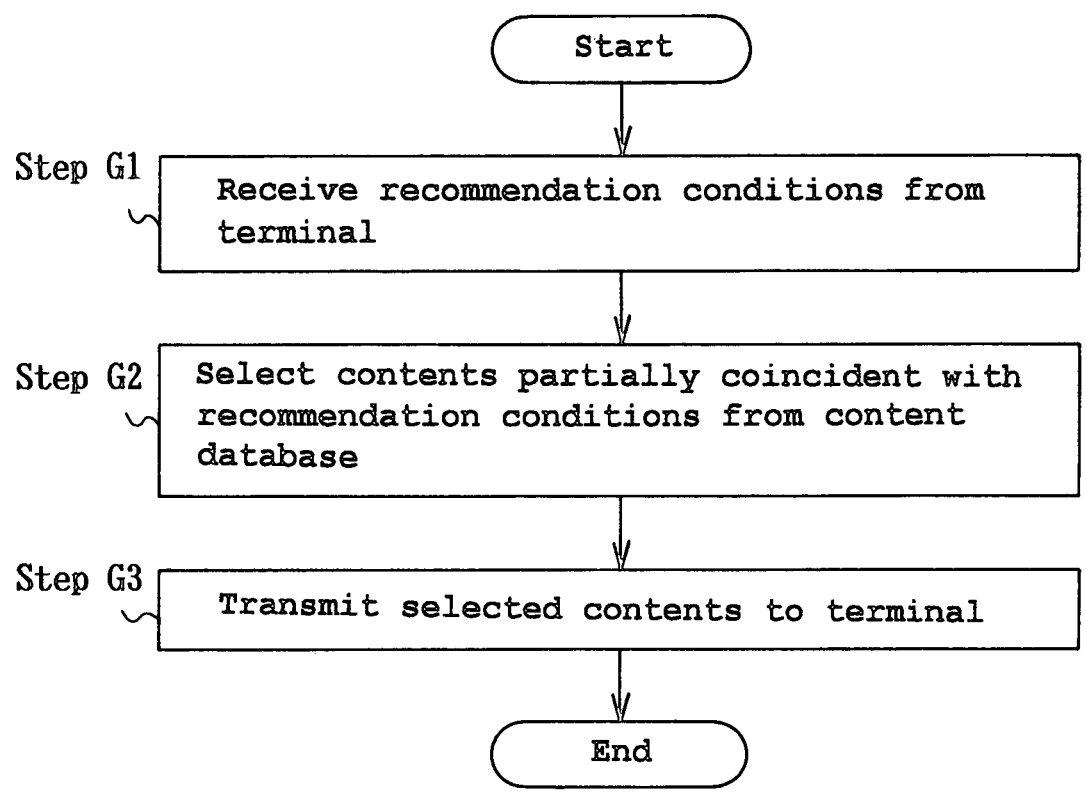
FIG. 23 is a flowchart showing information recommendation operation in accordance with Embodiment 6 of the present invention.

In the following description, a dish recommendation system is taken as an example and described referring to a flowchart shown in FIG. 23.

(Preparation)

Abundant pieces of content data have been registered beforehand in the content database 2. By forming a configuration wherein many users can register content data through the terminal 100 by using the content registration means 8, abundant various content data can be collected easily.

(Step G1)

Recommendation conditions input by the user through the terminal 100 are transmitted via the Internet 500 and received by the network interface means 1 of the information recommendation apparatus 1000.

For example, when "curry" is input as a recommendation condition through the terminal 100, that is, when "recipe" is input as an item and "curry" is input as an attribute value, these are transmitted to the information recommendation apparatus 1000 and input to the recommendation condition input means 3.

(Step G2)

According to the recommendation condition received at step G1, the content recommendation means 4 selects data in which recipe names used as attribute values corresponding to the item "recipe" in the content database 2 include the recommendation condition.

For example, when the attribute values corresponding to the item "recipe" are "curry and rice," "curry and spaghetti," "seafood curry," "curry doria," etc., these recipe names include the character string "curry" used as the recommendation condition. These contents are selected. As described above, even the contents having attribute values including content data partially coincident with the recommendation condition can become objects to be selected.

(Step G3)

The contents (recipe data) selected at step G2 are transmitted from the content output means 5 to the terminal 100 via the network interface means 1, and the contents and lists thereof are displayed on the display screen of the terminal 100.

The display method of the terminal 100 is not specified in particular. However, recipes are displayed on a WWW browser as shown in FIG. 15, for example.

At this time, two or more contents having the same recipe name may present. For example, two or more contents having the recipe name "curry and rice" may present. In this case, only one of the contents is selected as "curry and rice" to be output to the terminal on the basis of a predetermined standard, and the rest is discarded.

By using the procedure described above, contents obtained by applying the recommendation conditions or by deriving the recommendation conditions can be recommended from among all of content data in the content database 2.

In the case of recipes for dishes in particular, it is supposed that infinite recipes are available. That is, original recipes created for every family or every individual are available. In this embodiment, since the user can register contents, such various recipes can be collected. Furthermore, by using the collected recipes, various "curry" application recipes can be recommended in the case of the condition "curry."

Embodiment 7

Next, Embodiment 7 will be described below.

FIG. 22 is a view showing the system configuration of an information recommendation apparatus in accordance with Embodiment 7. This system configuration is the same as that of Embodiment 6.

The format of the data registered in the content database 2 is shown in FIG. 24. In FIG. 24, all items of the recipes served for a meal are described in one piece of content data, and "data ID," "recipe name," "cooking method," "ingredients," etc. are available as attributes. Among these, it is essential that the names of all dishes taken at a meal should be written in the "recipe name." The other items "cooking method," "ingredients," etc. are not essential. In addition, items other than the attributes indicated in the figure may be included.

As described above, Embodiment 7 can have new effects by changing the format of content data registered in the content database 2, by changing the recommendation condition acceptance method and by changing the search method. The operations in this embodiment will be described below.

Furthermore, since a hardware configuration by which the system configured as described above is operated is basically identical to that of a general-purpose computer system, the explanation of the configuration is omitted.

Figure 25:
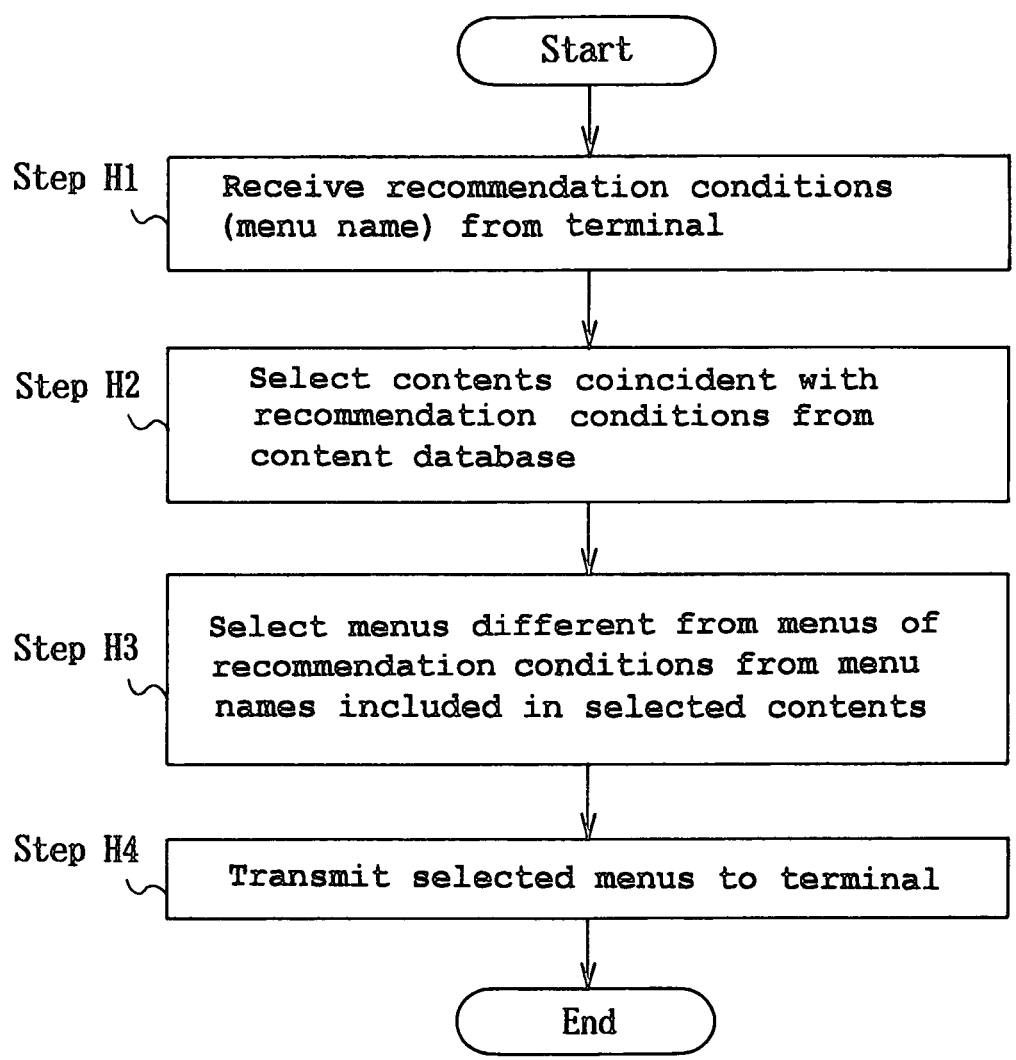
FIG. 25 is a flowchart showing information recommendation operation in accordance with Embodiment 7 of the present invention.

In the following description, a dish recommendation system is taken as an example and described referring to a flowchart shown in FIG. 25.

(Preparation)

Abundant pieces of content data have been registered beforehand in the content database 2. By forming a configuration wherein many users can register content data through the terminal 100 by using the content registration means 8, abundant various content data can be collected easily.

(Step H1)

Recommendation conditions input by the user through the terminal 100 are transmitted via the Internet 500 and received by the network interface means 1 of the information recommendation apparatus 1000.

For example, when "hamburger" is input as a recommendation condition through the terminal 100, that is, when "recipe name" is input as an item and "hamburger" is input as an attribute value corresponding thereto, these are transmitted to the information recommendation apparatus 1000, and input to the recommendation condition input means 3.

(Step H2)

According to the recommendation condition received at step H1, the content recommendation means 4 selects data in which one of recipe names in the content database 2 includes the recommendation condition.

For example, when content data includes a group of recipe names "curry and rice," "fruit salad," and "oolong tea," the recommendation condition "hamburger" is not included therein. Hence, the content data is not selected.

Furthermore, when content data includes a group of recipe names "hamburger," "Caesar salad" and "potage soup," the recommendation condition "hamburger" is included therein. Hence, the content data is selected.

(Step H3)

Next, recipe names different from the recommendation condition are selected from the group of recipe names in the content data selected at step H2. For example, when the group consists of "hamburger," "Caesar salad" and "potage soup," "Caesar salad" or "potage soup" different from the recommendation condition "hamburger" is selected. In this case, one of them or both of them may be selected. Alternatively, all the recipe names including the recipe name used as the recommendation condition may be selected from the same group of recipe names.

(Step H4)

The recipe names selected at step H3 are transmitted from the content output means 5 to the terminal 100 via the network interface means 1, and the contents and lists thereof are displayed on the display screen of the terminal 100.

The display method of the terminal 100 is not specified in particular. However, recipes are displayed on a WWW browser as shown in FIG. 15, for example.

At this time, when two or more contents having the same recipe name are present, only one of the contents is output to the terminal, and the rest is discarded.

By using the procedure described above, content data suited to be provided together with certain content data can be recommended from among all of content data in the content database 2.

Furthermore, the recipe names of dishes taken for a meal are described in a piece of content data registered in the content database 2. However, there is no setting of a main-and-subordinate relation among them. The recipe names of dishes taken simultaneously are simply described. Therefore, various recipes can be recommended without being restricted by the concept of main and subordinate dishes.

In this embodiment, the recipe names of dishes taken for a meal are described in a piece of content data. However, this embodiment is not limited to this. Identification information indicating dishes taken simultaneously may be assigned to all of the content data regarding the dishes taken simultaneously. Alternatively, a table indicating the relationship among the content data regarding dishes taken simultaneously may be prepared separately. Alternatively, a common ID may be assigned to the content data regarding dishes taken simultaneously.

The content data in which all the recipes for dishes taken for a meal in accordance with this embodiment is an example of a recipe group of dishes taken for a meal. A piece of data corresponding to each recipe in accordance with this embodiment is an example of a recipe in accordance with the present invention. Furthermore, when identification information indicating dishes taken simultaneously is assigned to all of the content data regarding the dishes taken simultaneously, the content data regarding the dishes taken simultaneously is an example of a recipe group of dishes taken for a meal. In this case, the content data is an example of a recipe in accordance with the present invention. Furthermore, when a table indicating the relationship among content data regarding dishes taken simultaneously is prepared separately, the content data related by the table is an example of a recipe group for dishes taken for a meal. In this case, the content data is an example of a recipe in accordance with the present invention.

Embodiment 8

Next, Embodiment 8 will be described below.

Figure 26:
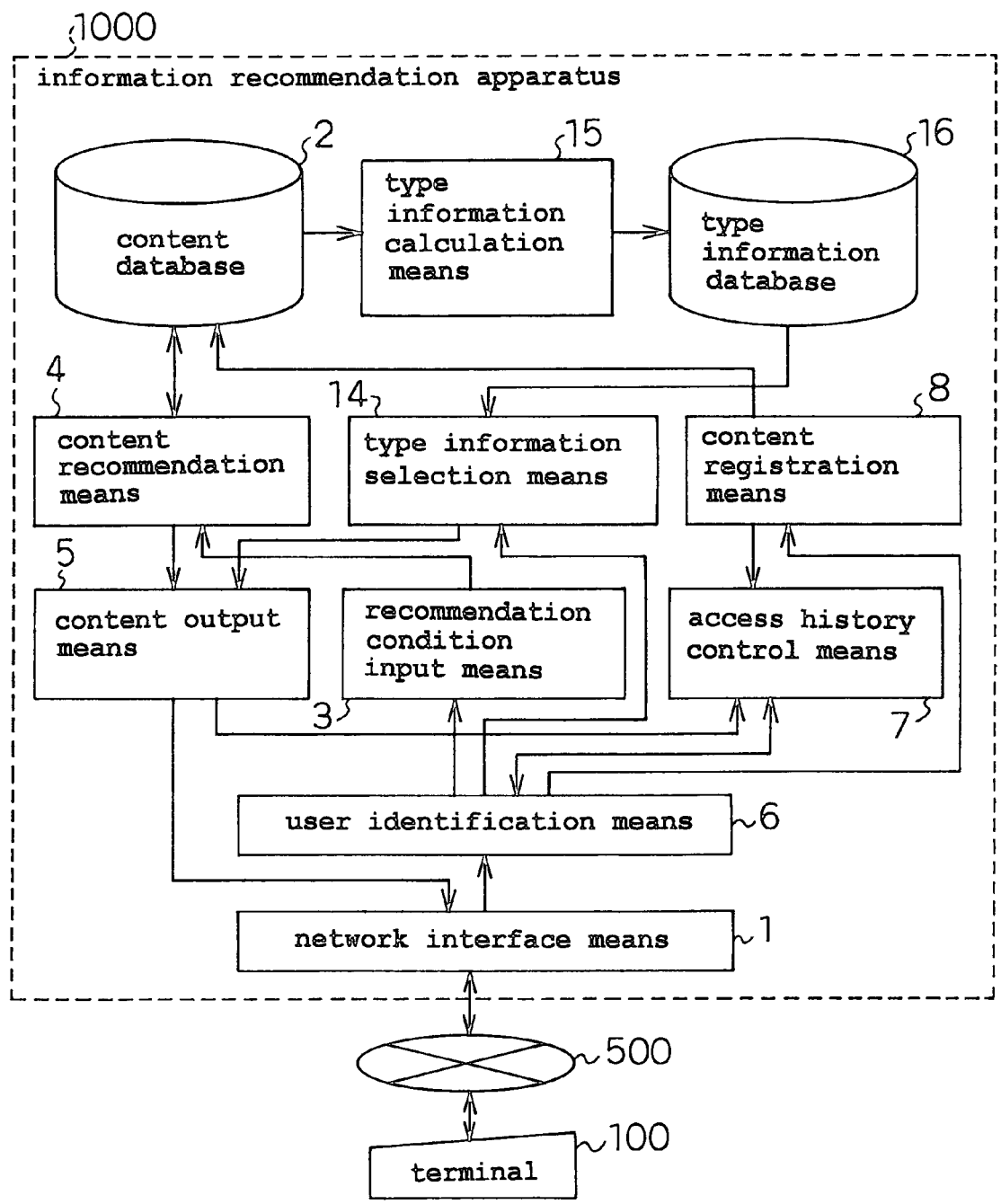
FIG. 26 is a view showing a system configuration in accordance with Embodiment 8 of the present invention.

FIG. 26 is a view showing the system configuration of an information recommendation apparatus in accordance with Embodiment 8. This configuration is obtained by adding type information calculation means 15 of obtaining the registered user type information by calculation from the data registered in the content database 2, by adding a type information database 16 in which the user type information obtained by calculation by the type information calculation means 15, and by adding type information selection means 14 of selecting type information similar to information on the user identified by the user identification means 6 from the type information database 16 to the configuration of Embodiment 2. The configuration of Embodiment 2 shown in FIG. 5 comprises the network interface means 1, the content database 2, the recommendation condition input means 3, the content recommendation means 4, the content output means 5, the user identification means 6, the access history control means 7 and the content registration means 8.

Furthermore, since a hardware configuration by which the system configured as described above is operated is basically identical to that of a general-purpose computer system, the explanation of the configuration is omitted.

The type information is statistical information on users conforming to a certain condition. For example, it is assumed that 1000 users registered information in the content database 2. Among the users, it is assumed that 500 users live in the Kanto area, that 400 users live in the Kansai area, and that 100 users, i.e., the rest of the users, live in other areas. When obtaining "type information in the Kanto area" for example, a procedure to be used at this time is similar to the procedure for generating the user characteristic information described in the explanation of Embodiment 3. For example, only the data registered by the users living in the Kanto area is selected from among the data registered in the content database 2. The ingredient names occurring in the registered data and their occurrence frequencies are counted, and the frequencies are normalized as shown in FIG. 10. The obtained information indicates tendencies regarding food for the users living in the Kanto area. This information is referred to as type information.

This kind of type information can be obtained by calculation from various viewpoints, such as the distinction of sex, age bracket, occupation and the distinction between unmarried and married, in addition to the type information depending on the user classified by residential area.

In this embodiment, the user is first required to register content data before the user receives information recommendation just as in the case of Embodiment 2.

The procedure for registering the content data is similar to the content data registration procedure shown in FIG. 6 and described in the explanation of Embodiment 2.

Figure 27:
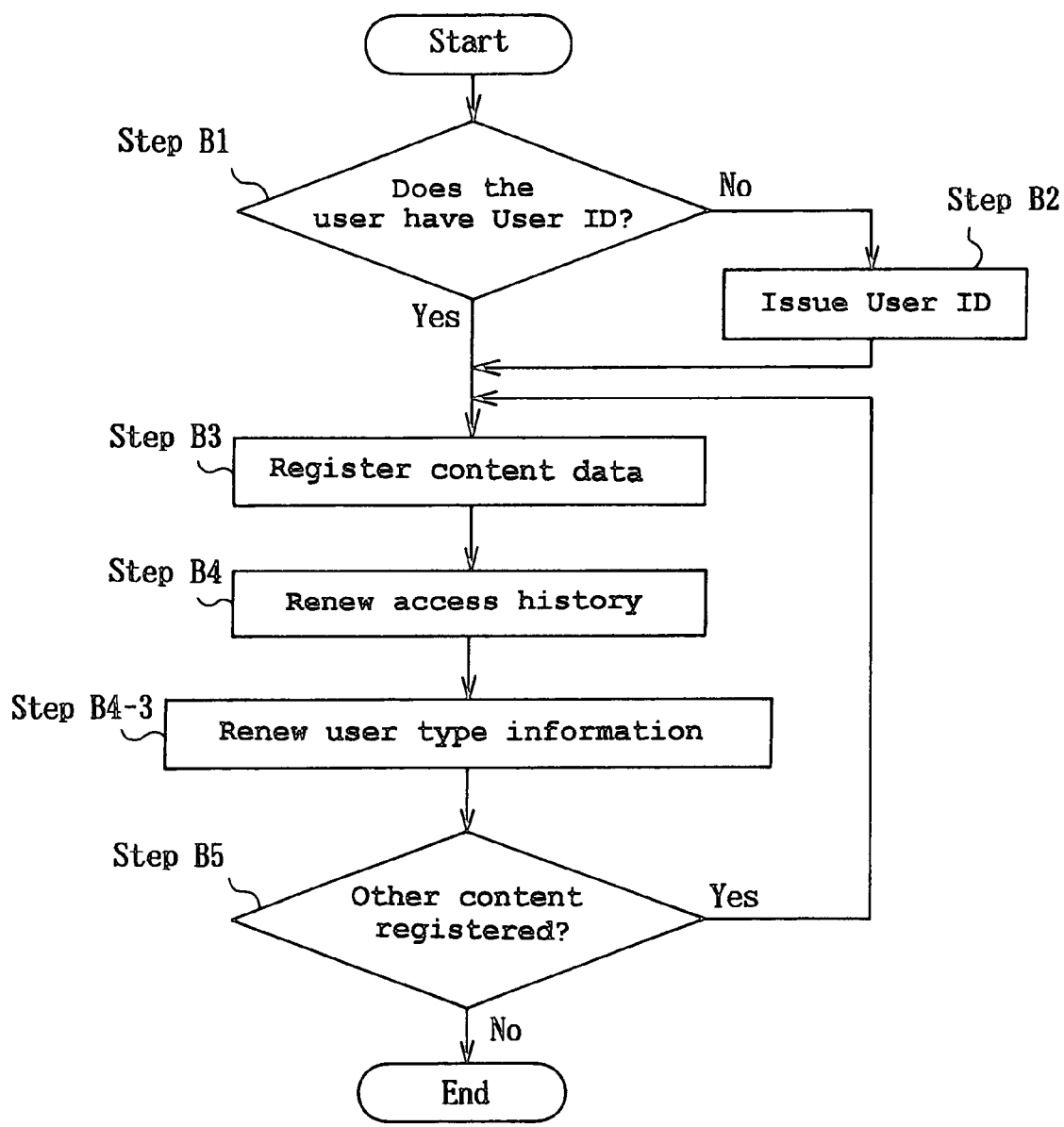
FIG. 27 is a flowchart showing registration operation in accordance with Embodiment 8 of the present invention.

FIG. 27 shows the procedure. In this procedure, new step B4-3 is added between step B4 and step B5 in FIG. 6.

In other words, contents are registered in accordance with a procedure similar to that shown in FIG. 6. User access history is renewed at step B4. At step B4-3, by referring to the content data registered by the user so far from the content database 2, the type information calculation means 15 renews the user type information and registers the information in the type information database 16.

The type information calculation method is as described before. The type information additionally including currently registered information is renewed.

By the above-mentioned procedure, the content data is registered, and the type information is also generated and renewed simultaneously.

The generation and renewal of the type information are not necessarily required to be carried out at the time of the registration of the content data. When the content data is registered, the registration may be carried out according to the procedure shown in FIG. 6, and when the load on the information recommendation system is relatively low, the renewal operation of the type information, that is, only the operation at step B4-3 in FIG. 27, may be carried out.

Figure 28:
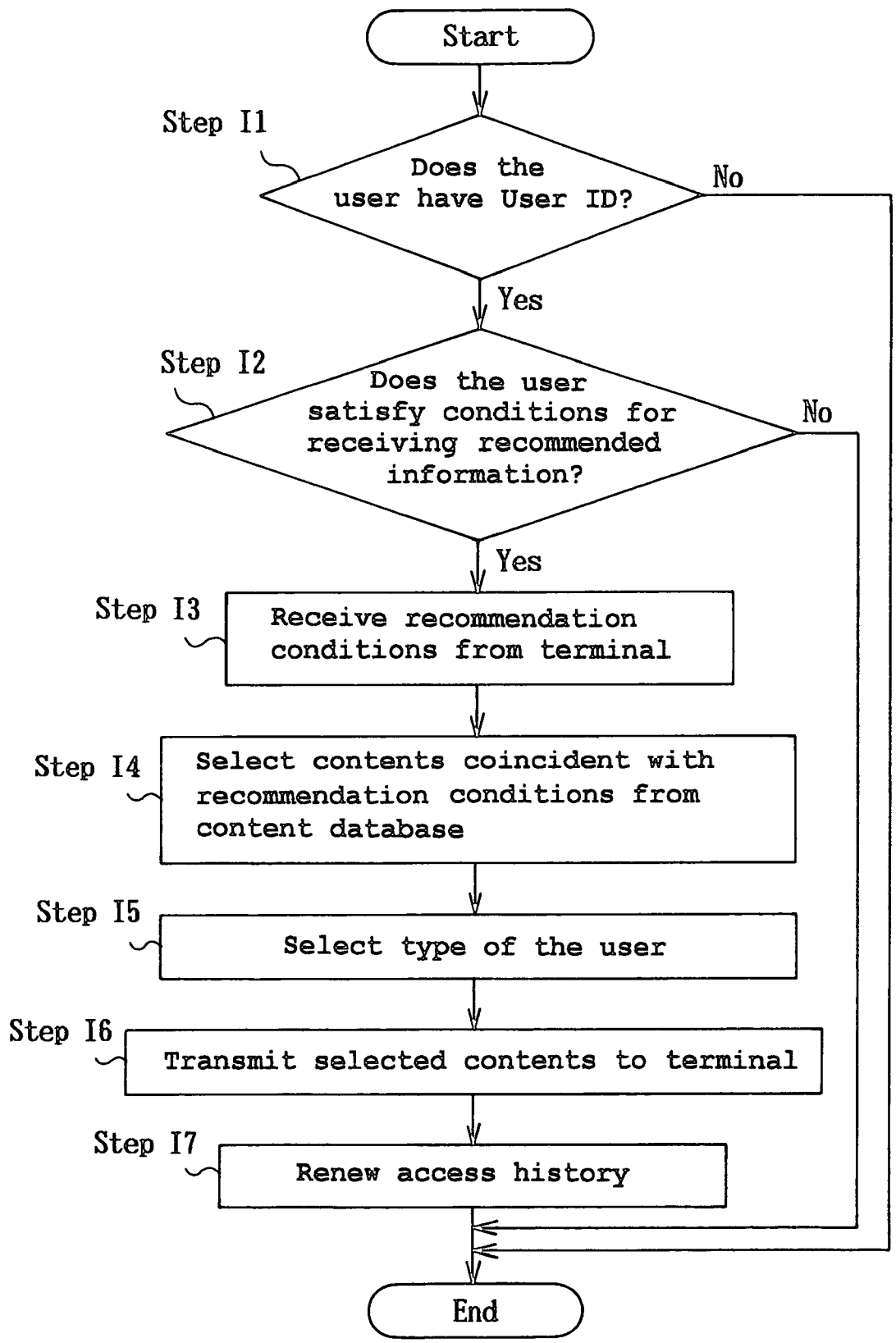
FIG. 28 is a flowchart showing information recommendation operation in accordance with Embodiment 8 of the present invention.

Next, an operation for the user to receive information recommendation will be described below referring to a flowchart shown in FIG. 28.

(Steps I1 to I3)

When the user issues a request for information recommendation to the information recommendation apparatus by using the terminal 100, a check is made as to whether conditions for having approval of the user ID and for receiving recommended information have been satisfied or not. In this embodiment, it is essential that the user who wishes to receive recommended information must register content data beforehand. If the conditions are not satisfied, the processing ends.

If the conditions for receiving information recommendation are satisfied at step I2, the recommendation conditions are accepted from the user. This operation is similar to that at steps C1 to C3 in FIG. 7.

(Step I4)

The contents registered in the content database 2 are selected on the recommendation conditions accepted at step I3. As a specific recommended content selection method, a procedure similar to that used at steps A21 to A24 shown in FIG. 4 and described already in the explanation of Embodiment 1 can be used.

Alternatively, as described already in the explanation of Embodiment 3, content data may also be endowed with content characteristic vectors, and a determination may be made by comparing the user characteristic information of the user who requested recommendation with content characteristic vectors. The user characteristic information may be obtained dynamically from the content data that is registered by the user in the past in the content database 2. In addition, by using the configuration having the user characteristic information database 12 (not shown), the characteristic vector of the user, registered in the user characteristic information database 12, may be referred to.

(Step I5)

Next, the type corresponding to the current user is selected. In this selection, the type best conforming to the user is selected from the type information database 16. As an example of a specific selection method, the inner products of user characteristic information and type data written in vector are obtained, and the largest inner product is selected.

For example, information best conforming to the type information on "company employee living in the Kansai area" is selected from the information on all the registered users.

(Steps I6 and I7)

The recommended information determined at step I4 and the type information determined at step I5 are displayed on the terminal of the user. The access history control means 7 renews and stores information for the current user, such as the date when information recommendation is received, the data ID of the recommended information and the number of times the user received information recommendation.

FIG. 29 is a display example of a result of information recommendation at the terminal.

This indicates that the user corresponds to the type information on "company employee living in the Kansai area."

The type information selection means 14 of this embodiment is an example of type judgment means of the present invention.

With the above-mentioned system configuration and operation, it is possible to indicate the type of the user together with recommended content information. In comparison with the indication of only recommended contents, the indication of the type information together with recommended contents provides the preferences and selection characteristics of the user by using other ways of expression. Hence, the user can find his or her unintentional tendencies. As a result, the information recommendation system can be made more interesting and convenient.

In Embodiments 1 to 8, an example using the Internet is described as communication means of connecting the server apparatus to the terminals. However, instead of the Internet, public telephone networks, portable telephone networks and digital broadcasting networks using satellites and ground waves may also be used. Alternatively, it may be possible to use an asymmetrical configuration of communication means wherein digital broadcasting networks are used from the server apparatus to the terminals, and the Internet is used from the terminals to the server apparatus.

As described above, in Embodiment 1, contents and attribute values have been registered in the content database 2. Hence, it is possible to accomplish an information recommendation apparatus capable of recommending data conforming to the request of the user from among content data having been stored in the content database 2. By providing content data having subjective characteristic amounts as attributes in particular, information recommendation can be attained according to subjective or sensitive recommendation conditions, such as "easy-cooking dish," "light dish" and "enjoyable dish."

Furthermore, in Embodiment 2, information recommendation is limited depending on the registration results of contents. Hence, it is possible to accomplish an information recommendation apparatus wherein content data stored in the content database 2 can be made complete and data conforming to the request of the user can be recommended.

Furthermore, the user is asked to enter subjective evaluation items at the time of content registration. Hence, the relative merits of the registered contents can be determined. By considering this matter at the time of content recommendation, contents having higher merits can be recommended.

Furthermore, the user is asked to enter items regarding cause-effect relations before and after eating at the time of content registration. Hence, the user can designate conditions in view of cause-effect relations of a meal, such as "a dish to be taken when not feeling well," "a dish giving pleasant feelings after eating," and the user can receive the recommendation of contents.

Furthermore, the user is asked to enter items regarding the person who prepares a dish or the person who eats a dish at the time of registration. Hence, the user can designate conditions from the standpoint of the person who prepares a dish or the person who eats a dish, and can receive the recommendation of contents.

Moreover, the user can search for contents easily with an interface capable of making input easy by using registration items that can be made quantitative.

Furthermore, in Embodiment 3, information recommendation is limited depending on the registration results of contents, and recommendation conditions are extracted from the contents registered by the user. Hence, it is possible to accomplish an information recommendation apparatus wherein appropriate data suited for the user can be recommended while the user is not required to input specific recommendation conditions.

Furthermore, in Embodiment 4, content data conforming to the recommendation conditions can be recommended, and an advertisement corresponding to the data can be shown. In addition, it is possible to perform control to find out which advertisement is displayed and how many times the advertisement is displayed. Hence, it is possible to charge the advertiser of the advertisement an advertisement rate depending on the number of times.

Furthermore, in Embodiment 5, it is possible to accomplish an information recommendation apparatus wherein content data stored in the content database 2 can be made complete, users having similar preferences can be selected, and content data registered by the users having can be recommended.

Furthermore, in Embodiment 6, it is possible to accomplish an information recommendation apparatus wherein contents obtained by applying the recommendation conditions or by deriving from the recommendation conditions can be recommended from among all of content data in the content database 2.

Furthermore, in Embodiment 7, it is possible to accomplish an information recommendation apparatus wherein content data suited to be provided together with certain content data can be recommended from among all of content data in the content database 2.

Furthermore, in Embodiment 8, it is possible to indicate the type of the user together with recommended content information. In comparison with the indication of only recommended contents, the indication of the type information together with recommended contents provides the preferences and selection characteristics of the user by using other ways of expression. Hence, the user can find his or her unintentional tendencies. As a result, it is possible to accomplish an information recommendation apparatus being more interesting and convenient.

The program of the present invention operates together with a computer so that the computer carries out the functions of all or some means (apparatuses, devices, circuits, etc.) of the above-mentioned information recommendation apparatus of the present invention.

Some means (apparatuses, devices, circuits, etc.) of the present invention are defined as several means in a plurality of means or some functions in one means.

Furthermore, the present invention includes recording media on which the program of the present invention is recorded and which can be read by computers.

Furthermore, a usage configuration of the program of the present invention may be an embodiment wherein the program is recorded on the recording media capable of being read by computers and the program operates together with computers.

Furthermore, another usage configuration of the program of the present invention may be an embodiment wherein the program is transmitted through transmission media, read by computers and executed together with computers.

Furthermore, ROM and the like are included as recording media. The Internet, light/electric waves, sound waves and the like are included as transmission media.

Furthermore, the above-mentioned computers of the present invention are not limited to pure hardware, such as CPU, but may include firmware, OS and peripherals.

As described above, the configuration of the present invention may be accomplished by software or by hardware.

(Effects of the Invention)

As described above clearly, in order to accomplish information service using an information server, the present invention can provide an information recommendation apparatus, an information recommendation system and a program capable of preparing abundant contents.

Furthermore, the present invention can provide an information recommendation apparatus, an information recommendation system and a program capable of recovering maintenance cost for constructing and maintaining a large database.

Furthermore, the present invention can provide an information recommendation apparatus, an information recommendation system and a program capable of easily finding out information that is exactly suited for a user but unnoticed.

Furthermore, the present invention can provide an information recommendation apparatus, an information recommendation system and a program capable of providing recipes suited for actual daily menus for family.

Furthermore, the present invention can provide an information recommendation apparatus, an information recommendation system and a program capable of providing recipes not void of viewpoints obtained by the result of actually using the recipes and suited for actual situations.

What is claimed is:

1. An information recommendation apparatus for a service provider and a plurality of users comprising:
    a content database at the service provider for storing a plurality of contents formed of objective plural pieces of data having a plurality of ingredients, each set of ingredients operated on by a differing process;
    content registration means of the service provider receiving the registration of new contents from one of the plurality of users and registering said new contents in said content database, the new contents formed of objective plural pieces of data having a plurality of ingredients, each set of ingredients operated on by a differing process;
    condition input means of inputting conditions from the one user to the service provider represented by predetermined items and attribute values;
    recommendation means of the service provider selecting and recommending contents of said plurality of contents to the one user coincident with or similar to said input conditions by said condition input means from said content database;
    access history control means of determining the number of recommendation times and recommendation information of contents recommended by said recommendation means on the basis of the number of times the one user carried out content registration by using said content registration means, and
    output means of outputting said recommended contents to the one user determined by said access history control means from the service provider,
    wherein the more the one user is incentives to register contents, the more recommended contents are outputted as rewards to the one user to search through and consider,
    wherein the one user's received recommended contents are in number at least greater than the number of times the one user carried out content registration,
    wherein said condition input means is equipped with condition extraction means of extracting input conditions on the basis of the new contents having been registered in the past by the one user who receives recommendation, and wherein the number of recommendation times and recommendation information of contents recommended by said recommendation means is determined solely on the basis of the number of times the one user carried out content registration by using said content restoration means.

2. An information recommendation apparatus according to claim 1, wherein said new contents to be registered by the one user are cooking contents, and items constituting said cooking contents include objective items including at least one data item of cooking time, the number of dishes, calorie, material cost, family structure and atmospheric temperature, and subjective items including at least one data item of tastiness level, satisfaction level, enjoyment level, richness level and refreshment level.

3. An information recommendation apparatus according to claim 2, wherein said new contents to be registered by the one user are cooking contents, and items constituting said cooking contents further have an item of making distinction between a person who cooks and a person who eats.

4. An information recommendation apparatus according to any one of the claims 1, 2, and 3, wherein said condition input means is equipped with condition extraction means of extracting input conditions on the basis of the contents having been recommended in the past to the one user attempting to receive recommendation or the contents recommended to and designated by the one user.

5. An information recommendation apparatus according to claim 4 wherein said condition input means comprises means of externally inputting conditions, and said condition extraction means, and said recommendation means selects said contents, coincident with or similar to said conditions extracted by using said condition extraction means, from only said contents conforming to said externally input conditions, and recommends said selected contents.

6. An information recommendation apparatus according to any one of claims 1, 2, and 3, wherein said condition input means is equipped with condition extraction means of extracting input conditions on the basis of the occurrence frequencies of the attribute values corresponding to the items constituting the new contents registered in the past by the one user who receives recommendation.

7. An information recommendation apparatus according to claim 6, wherein said conditions having tendencies opposite to the tendencies of the occurrence frequencies of said contents are extracted as said input conditions.

8. An information recommendation apparatus according to claim 6 wherein said condition input means comprises means of externally inputting conditions, and said condition extraction means, and said recommendation means selects said contents, coincident with or similar to said conditions extracted by using said condition extraction means, from only said contents conforming to said externally input conditions, and recommends said selected contents.

9. An information recommendation apparatus according to any one of claims 1, 2, and 3, wherein said condition input means is equipped with the condition extraction means of extracting input conditions on the basis of the occurrence frequencies of the attribute values corresponding to the items constituting the contents having been recommended in the past to the one user attempting to receive recommendation or the occurrence frequencies of the attribute values corresponding to the items constituting the contents recommended to and designated by the one user by using designation means.

10. An information recommendation apparatus according to claim 9, wherein said conditions having tendencies opposite to the tendencies of the occurrence frequencies of said contents are extracted as said input conditions.

11. An information recommendation apparatus according to claim 9 wherein said condition input means comprises means of externally inputting conditions, and said condition extraction means, and said recommendation means selects said contents, coincident with or similar to said conditions extracted by using said condition extraction means, from only said contents conforming to said externally input conditions, and recommends said selected contents.

12. An information recommendation apparatus according to any one of claims 1, 2, and 3, wherein said condition input means is equipped with condition extraction means of extracting input conditions on the basis of occurrence frequencies of the words extracted from the texts in the contents registered in the past by the one user who receives recommendation.

13. An information recommendation apparatus according to claim 12, wherein said conditions having tendencies opposite to the tendencies of the occurrence frequencies of said contents are extracted as said input conditions.

14. An information recommendation apparatus according to claim 12 wherein said condition input means comprises means of externally inputting conditions, and said condition extraction means, and said recommendation means selects said contents, coincident with or similar to said conditions extracted by using said condition extraction means, from only said contents conforming to said externally input conditions, and recommends said selected contents.

15. An information recommendation apparatus according to any one of claims 1, 2, and 3, wherein said condition input means is equipped with condition extraction means of extracting input conditions on the basis of the occurrence frequencies of the words extracted from the texts in the contents having been recommended in the past to the one user attempting to receive recommendation or the occurrence frequencies of the words extracted from the texts in the contents recommended to and designated by the one user.

16. An information recommendation apparatus according to claim 15 wherein said conditions having tendencies opposite to the tendencies of the occurrence frequencies of said contents are extracted as said input conditions.

17. An information recommendation apparatus according to claim 15 wherein said condition input means comprises means of externally inputting conditions, and said condition extraction means, and said recommendation means selects said contents, coincident with or similar to said conditions extracted by using said condition extraction means, from only said contents conforming to said externally input conditions, and recommends said selected contents.

18. An information recommendation apparatus according to claim 1 wherein said condition input means comprises means of externally inputting conditions, and said condition extraction means, and said recommendation means selects said contents, coincident with or similar to said conditions extracted by using said condition extraction means, from only said contents conforming to said externally input conditions, and recommends said selected contents.

19. An information recommendation apparatus according to claim 1, comprising:

user characteristic information calculation means of obtaining characteristic information by calculation for each of said items on the basis of the contents registered in the past by the one user who receives recommendation, or the contents recommended to the one user or the contents recommended to and designated by the one user by using designation means, and a user characteristic information data bas of storing the characteristic information obtained by calculation by using said one user characteristic information calculation means, wherein in the case of recommendation to a specific user of the plurality of users, said recommendation means specifies other users of the plurality of users whose characteristic information is coincident with or similar to said characteristic information of said specific user on the basis of said characteristic information stored in said one user characteristic information database, and selects and recommends the contents registered in the past by the other users or the contents recommended to and designated by the other users.

20. An information recommendation apparatus according to claim 1, comprising:

user characteristic information by calculation means of obtaining characteristic information by calculation for each of said items on the basis of the contents registered in the past by the user who receives recommendation, or the contents recommended to the user or the contents recommended to and designated by the user by using designation means, a user characteristic information database of storing the characteristic information obtained by calculation by using said user characteristic information calculation means, type information calculation means of calculating said characteristic information calculated for each of said items as type information for each of said users, said various characteristics having been input, type information selection means of selecting said type information of the user attempting to receive the recommendation by comparing said type information calculated by said type information calculation means with said characteristic information of the user attempting to receive the recommendation, and display means of displaying the user type information selected by using said type information selection means.

21. An information recommendation apparatus according to claim 20, wherein said user characteristic is any one of the place of residence, the distinction of sex, age bracket, occupation and distinction between unmarried and married.

22. An information recommendation apparatus according to claim 1, wherein the plurality of contents are formed of subjective plural pieces of data having attribute values corresponding to subjective viewpoints of the one user and the new contents are formed of subjective plural pieces of data having attribute values corresponding to subjective viewpoints of the one user.

23. A method of providing a recommendation by a service provider comprising:

receiving conditions input from one user of a plurality of users, the conditions represented by predetermined items and attribute values corresponding thereto, from among a plurality of contents formed of objective plural pieces of data having a plurality of ingredients, each set of ingredients operated on by a differing process and stored in a content database in which new contents are registered by the one user, wherein the new contents are formed of objective plural pieces of data having a plurality of ingredients, each set of ingredients operated on by a differing process;

selecting and recommending contents to the one user coincident with or similar to the conditions input; and outputting the recommended contents to the one user, wherein a number of times or the content of the recommendation which the one user attempting to receive recommendation receives is determined depending on the number of times said user carried out registration;

wherein the more the one user is incentives to register contents, the more recommended contents are outputted as rewards to the one user to search through and consider, wherein the one user's received recommended contents are in number at least greater than the number of times the one user carried out content registration, wherein said conditions input are automatically extracted based on contents registered in the past by a user who will receive recommendation, and wherein the number of times or the content of the recommendation which the one user attempting to receive recommendation receives is determined depending solely on the number of times said user carried out registration.

24. The method according to claim 23 wherein the number of registration times of said one user is determined (a) by checking the access history of said user with respect to registration or (b) by assigning the one user ID of the registrant to said content and by using said one user ID.

25. The method according to claim 23 wherein the conditions input are automatically extracted based on contents recommended in the past to a user who is attempting to receive recommendation or based on contents recommended to and specified by said one user.

* * * * *

UNITED STATES PATENT AND TRADEMARK OFFICE
CERTIFICATE OF CORRECTION

PATENT NO. : 7,373,318 B2  Page 1 of 1
APPLICATION NO. : 09/851791
DATED : May 13, 2008
INVENTOR(S) : Kutsumi et al.

It is certified that error appears in the above-identified patent and that said Letters Patent is hereby corrected as shown below:

On the Cover Page, item [56], References Cited, OTHER PUBLICATIONS:
"Shafer, J.B., et al.," should read --Schafer, J.B., et al.,--

At Column 44, line 57, "user is incentives" should read --user is incentivized--

At Column 45, line 8, "said content restoration" should read --said content registration--

At Column 46, line 51, "claim 15" should read --claim 15,--

At Column 48, line 31, "user is incentives" should read --user is incentivized--

Signed and Sealed this

Thirteenth Day of July, 2010

David J. Kappos
*Director of the United States Patent and Trademark Office*